US011983822B2

(12) United States Patent
Estee

(10) Patent No.: US 11,983,822 B2
(45) Date of Patent: May 14, 2024

(54) SHARED VIEWING OF VIDEO WITH PREVENTION OF CYCLICAL FOLLOWING AMONG USERS

(71) Applicant: VALEO COMFORT AND DRIVING ASSISTANCE, Creteil (FR)

(72) Inventor: Nicodemus Estee, San Francisco, CA (US)

(73) Assignee: VALEO COMFORT AND DRIVING ASSISTANCE (FR)

( * ) Notice: Subject to any disclaimer, the term of this patent is extended or adjusted under 35 U.S.C. 154(b) by 33 days.

(21) Appl. No.: 17/902,080

(22) Filed: Sep. 2, 2022

(65) Prior Publication Data
US 2024/0078757 A1 Mar. 7, 2024

(51) Int. Cl.
*G06T 19/00* (2011.01)
(52) U.S. Cl.
CPC ........ *G06T 19/003* (2013.01); *G06T 2200/24* (2013.01); *G06T 2219/024* (2013.01)
(58) Field of Classification Search
CPC ........... G06T 2219/024; G06T 2200/24; G06T 19/003
See application file for complete search history.

(56) References Cited

U.S. PATENT DOCUMENTS

| | | | |
|---|---|---|---|
| 8,893,010 B1 | 11/2014 | Brin et al. | |
| 9,324,173 B2 | 4/2016 | Castelli et al. | |
| 9,392,212 B1 | 7/2016 | Ross | |
| 9,530,426 B1 | 12/2016 | Wright et al. | |
| 9,654,831 B2 | 5/2017 | Stern | |
| 9,762,851 B1 | 9/2017 | Baumert et al. | |
| 9,883,138 B2 | 1/2018 | Chen et al. | |
| 10,277,813 B1 | 4/2019 | Thomas et al. | |

(Continued)

FOREIGN PATENT DOCUMENTS

| WO | WO-2018057980 A1 | 3/2018 |
|---|---|---|
| WO | WO-2018230563 A1 | 12/2018 |

OTHER PUBLICATIONS

Gaspar, J et al., "Providing Views of the Driving Scene to Drivers' Conversation Partners Mitigates Cell-Phone-Related Distraction", Psychological Science 2014, vol. 25, No. 12, pp. 2136-2146.

(Continued)

*Primary Examiner* — Phi Hoang
(74) *Attorney, Agent, or Firm* — Weaver Austin Villeneuve & Samson LLP

(57) ABSTRACT

In some examples, a computer device uses an input video stream to generate an output video stream for presentation to a first user. The output video stream corresponds to a three-dimensional space as seen from a viewing direction specified by a particular user among a set of users including at least the first user and a second user. In response to a request from the first user to follow a perspective of the second user, the computer device determines whether a cyclic dependency would be formed, then updates the output video stream accordingly. If a cyclic dependency would be formed, the computer device maintains the viewing direction of the particular user. If no cyclic dependency would be formed, the computer device switches to generating the output video stream based on a viewing direction associated with the second user.

20 Claims, 15 Drawing Sheets

(56) References Cited

U.S. PATENT DOCUMENTS

| | | |
|---|---|---|
| 10,284,753 B1 | 5/2019 | Naik et al. |
| 10,627,622 B2 | 4/2020 | Kuehne |
| 2005/0116964 A1 | 6/2005 | Kotake et al. |
| 2010/0131947 A1 | 5/2010 | Ackley et al. |
| 2013/0076853 A1 | 3/2013 | Diao |
| 2013/0257899 A1 | 10/2013 | Baron et al. |
| 2013/0293468 A1 | 11/2013 | Perez et al. |
| 2014/0032679 A1 | 1/2014 | Tandon et al. |
| 2014/0036027 A1 | 2/2014 | Liu |
| 2014/0177841 A1 | 6/2014 | Hazzani et al. |
| 2014/0245192 A1 | 8/2014 | Chavez |
| 2014/0304750 A1 | 10/2014 | Lemmey et al. |
| 2014/0328148 A1 | 11/2014 | Yang et al. |
| 2015/0005630 A1 | 1/2015 | Jung et al. |
| 2015/0211880 A1 | 7/2015 | Arita et al. |
| 2016/0150212 A1 | 5/2016 | Moura et al. |
| 2016/0341959 A1 | 11/2016 | Gibbs et al. |
| 2017/0011557 A1 | 1/2017 | Lee et al. |
| 2017/0075373 A1 | 3/2017 | Park et al. |
| 2017/0293809 A1 | 10/2017 | Thompson et al. |
| 2017/0313248 A1 | 11/2017 | Kothari |
| 2017/0339341 A1 | 11/2017 | Zhou et al. |
| 2017/0339372 A1 | 11/2017 | Valli |
| 2018/0089900 A1 | 3/2018 | Rober et al. |
| 2018/0089901 A1 | 3/2018 | Rober et al. |
| 2018/0091923 A1 | 3/2018 | Satongar et al. |
| 2018/0152663 A1 | 5/2018 | Wozniak et al. |
| 2018/0176502 A1 | 6/2018 | Bhuruth et al. |
| 2018/0189958 A1 | 7/2018 | Budagavi et al. |
| 2018/0232937 A1 | 8/2018 | Moyer et al. |
| 2018/0259958 A1 | 9/2018 | Kalanick et al. |
| 2018/0270464 A1 | 9/2018 | Harviainen et al. |
| 2018/0295389 A1 | 10/2018 | Kakurai |
| 2018/0311585 A1 | 11/2018 | Osman |
| 2018/0350143 A1 | 12/2018 | Kühne |
| 2018/0357036 A1 | 12/2018 | Tomita |
| 2018/0369702 A1 | 12/2018 | Hake |
| 2019/0019329 A1 | 1/2019 | Eyler et al. |
| 2019/0149731 A1 | 5/2019 | Blazer et al. |
| 2019/0204604 A1 | 7/2019 | Wu |
| 2019/0253693 A1 | 8/2019 | Ha et al. |
| 2019/0258880 A1 | 8/2019 | Brauer |
| 2019/0302761 A1 | 10/2019 | Huang et al. |
| 2019/0331914 A1 | 10/2019 | Lee et al. |
| 2019/0355178 A1 | 11/2019 | Hermina Martinez et al. |
| 2020/0066055 A1 | 2/2020 | Hermina Martinez et al. |
| 2021/0092371 A1 | 3/2021 | Han et al. |
| 2021/0120066 A1 | 4/2021 | Oyman et al. |
| 2021/0224765 A1* | 7/2021 | Siddique ............ G06Q 30/0643 |
| 2021/0255756 A1 | 8/2021 | Field et al. |
| 2021/0392293 A1 | 12/2021 | Abhishek et al. |
| 2022/0070241 A1 | 3/2022 | Yerli |
| 2022/0239719 A1 | 7/2022 | Gül et al. |
| 2022/0239887 A1 | 7/2022 | Estee et al. |
| 2022/0360826 A1* | 11/2022 | Perumalla ............ A63F 13/497 |
| 2023/0156246 A1* | 5/2023 | Bustamante ....... H04N 21/2396 725/25 |
| 2023/0217007 A1* | 7/2023 | Canberk .............. H04N 13/398 345/633 |

OTHER PUBLICATIONS

International Preliminary Report on Patentability (ISA/EPO) dated Dec. 3, 2020 in PCT Application No. PCT/EP/2019/061501.
International Search Report and Written Opinion (ISA/EPO) dated Jul. 30, 2019 in PCT Application No. PCT/EP/2019/061501.
Lee, G.A. et al., "A User Study on MR Remote Collaboration Using Live 360 Video", 2018, IEEE International Symposium on Mixed and Augmented Reality, pp. 153-164.
Notice of Allowance dated Aug. 16, 2019, in U.S. Appl. No. 15/984,065.
Notice of Allowance dated May 3, 2021, in U.S. Appl. No. 15/984,065.
Ochi D., et al., "Live Streaming System for Omnidirectional Video", 2015 IEEE Virtual Reality (VR), 2015, pp. 349-350.
Orts-Escolano, S., et al., "Holoportation: Virtual 3D Teleportation in Realtime", 29th ACM User Interface Software and Technology Symposium, Oct. 16-19, 2016, 14 pages.
U.S. Advisory Action dated Dec. 18, 2020, in U.S. Appl. No. 15/984,065.
U.S Advisory Action dated Feb. 23, 2023 in U.S. Appl. No. 17/156,307.
U.S. Final Office Action dated Dec. 1, 2022 in U.S. Appl. No. 17/156,307.
U.S. Final Office Action dated Oct. 7, 2020, in U.S. Appl. No. 15/984,065.
U.S. Non-Final Office Action dated Apr. 28, 2023, in U.S. Appl. No. 17/156,307.
U.S. Non-Final Office Action dated Dec. 4, 2020, in U.S. Appl. No. 16/667,644.
U.S. Non-Final Office Action dated Jul. 27, 2022 in U.S. Appl. No. 17/156,307.
U.S. Non-Final Office Action dated Mar. 14, 2022 in U.S. Appl. No. 17/156,307.
U.S. Non-Final Office Action dated Mar. 15, 2019, in U.S. Appl. No. 15/984,065.
U.S. Non-Final Office Action dated May 6, 2020, in U.S. Appl. No. 15/984,065.
U.S. Final Office Action dated Oct. 26, 2023 in U.S. Appl. No. 17/156,307.
U.S. Notice of Allowance dated Jan. 17, 2024 in U.S. Appl. No. 17/156,307.

* cited by examiner

1000

| User | Following | Viewing Direction |
|---|---|---|
| A | -- | User A's Quaternion |
| B | -- | User B's Quaternion |
| C | -- | User C's Quaternion |
| D | -- | User D's Quaternion |
| ... | | ... |

| User | Following | Viewing Direction |
|---|---|---|
| A | User C | User D's Quaternion |
| B | User D | User D's Quaternion |
| C | User B | User D's Quaternion |
| D | -- | User D's Quaternion |
| ... | | ... |

FIG. 10B

SHARED VIEWING OF VIDEO WITH PREVENTION OF CYCLICAL FOLLOWING AMONG USERS

TECHNICAL FIELD

The present disclosure generally relates to shared viewing of video content across different computer devices, where users of the computer devices can view the video content from different perspectives. Aspects of the disclosure also relate to a shared viewing environment in which users can adopt the viewing perspective of other users.

BACKGROUND

Computer systems are sometimes configured to share audio and/or visual content across computer devices. For instance, a computing environment may include two or more computer devices, each operated by a separate user. The computer devices may be equipped with cameras, microphones, display monitors, audio speakers, and/or other input/output devices that permit audiovisual data to be captured by one computer device for presentation at another computer device. Videoconferencing is an example of an application where the data communicated between computer devices includes captured video, e.g., live video of a user.

Some computer systems permit users to participate in a live, shared viewing experience such that users can view the same video content concurrently. For example, the video content may depict a scene within an artificial reality environment in which a first user can move around in virtual space to view different parts of the artificial reality environment while a second user does the same. In some instances, the scene may represent a real-world environment, which may or may not correspond to the environment around a user's computer device. For example, a camera with a relatively wide (e.g., greater than 180°) field of view may be used to capture images of a real-world location that is remote from any of the viewing users. Such cameras have been used in connection with presenting a virtual tour to users who are unable or prefer not to visit the real-world location in person. However, the images are usually captured in advance for subsequent access by individual users. In a shared viewing scenario, it is sometimes beneficial to permit users to interact with each other, such as by indicating which part of a scene a particular user is looking at.

SUMMARY

Aspects of the disclosure are directed to techniques for providing a shared viewing experience in which users are permitted to view a scene from different perspectives and to share their viewing perspectives such that other users can also view the scene from the same perspective. Aspects of the disclosure also relate to techniques for preventing a user from adopting the viewing perspective of another user in situations where doing so would result in a circular or cyclic dependency among users. For example, if a first user has already chosen to "follow" a second user by adopting the second user's viewing perspective, a cyclic dependency would be created if the second user in turn chooses to follow the first user. When users are permitted to follow each other in a cyclical manner, this may result in unexpected system behavior that leads to poor user experience. For instance, a user's computer device may enter an infinite programming loop, whereby the computer device is locked onto a particular user's viewing perspective and unable to change to another perspective.

In some examples, a computing environment in which a shared viewing experience is presented includes one or more cameras configured to capture images of a scene in 360 degrees, sometimes referred to as an omnidirectional camera, 360° camera, or "360 camera". The scene may be broadcast as a live video stream. However, the techniques described herein may also be applicable to other usage scenarios including, for example, quasi-360 video (i.e., less than a full 360° field of view), combining live 360° video with non-360 video such as webcam images of a user, or shared viewing of pre-recorded 360° video.

In some examples, a method for shared viewing of video involves receiving, by a first computer device operated by a first user, an input video stream representing a three-dimensional (3D) space and generating, by the first computer device using the input video stream, an output video stream corresponding to the 3D space as seen from a viewing direction specified by a particular user among a set of users. Each user in the set of users, including at least the first user and a second user, operates a separate computer device. The method further involves presenting, by the first computer device, the output video stream on a display to the first user and receiving, by the first computer device, a request from the first user to follow a perspective of the second user. The method further involves determining, in response to the request to follow the perspective of the second user, whether a cyclic dependency leading back to the first user would be formed as a result of the request and updating the output video stream. The updating of the output video stream may involve continuing to generate the output video stream based on the viewing direction specified by the particular user, in response to determining that the cyclic dependency would be formed. Alternatively, the updating of the output video stream may involve generating the output video stream based on a viewing direction associated with the second user, in response to determining that the cyclic dependency would not be formed. The viewing direction associated with the second user can be a viewing direction that, at a time of the request from the first user, is being used to generate a second output video stream for presentation through a second computer device to the second user. Further, the viewing direction associated with the second user can be a viewing direction specified by the second user or a viewing direction specified by a third user whose perspective the second user is following at the time of the request.

When the output video stream being presented to the first user is updated through generating the output video stream based on the viewing direction associated with the second user, the method may further involve informing, by the first computer device and through a server, computer devices of other users in the set of users that the first user is now following the perspective of the second user.

In the method described above, the particular user among the set of users is, in some instances, the first user. In other instances, the particular user is a third user whose perspective the first user is following at the time of the request.

In the method described above, a determination that the cyclic dependency would be formed may involve determining that the second user is already following a perspective of the first user at a time of the request. For instance, the method may involve determining that the second user is indirectly following the perspective of the first user through a chain of one or more additional users.

In some examples, the computer device of the first user in the method described above may be implemented as a computing apparatus including one or more processors, a display, and a memory storing instructions that are executable to cause the one or more processors to perform the method. The memory storing the instructions can be implemented as a non-transitory computer-readable storage medium.

BRIEF DESCRIPTION OF THE DRAWINGS

Aspects of the disclosure are illustrated by way of example. In the accompanying figures, like reference numerals indicate similar elements. Multiple instances of similar elements may be denoted using the same reference number followed by an additional label to distinguish among different instances, e.g., 100-A and 100-B may refer to two instances of an element 100.

FIG. 10A shows an example of user information maintained by a computer system, according to some embodiments.

FIG. 10B shows an example of user information updated based on follow requests from different users, according to some embodiments.

DETAILED DESCRIPTION OF THE INVENTION

The present disclosure relates to systems, apparatuses and corresponding methods for enabling two or more users to view a video stream from different perspectives while permitting a user to adopt the viewing perspective of another user in some circumstances. In some examples, the techniques described herein may be applied to present 360° video depicting a physical environment in substantially real time such that users can view different parts of the physical environment concurrently.

In some aspects, a computer system includes one or more computer devices configured to process a follow request from a user. As used herein, a "follow request" is a request from a first user to adopt the viewing perspective of a second user such that the first user's viewing perspective is to be updated to that of the second user. Processing of a follow request may involve a determination of whether a cyclic dependency would result when the first user adopts the viewing perspective of the second user. If a cyclic dependency would result, the one or more computer devices may deny the follow request. Otherwise, the follow request may be granted, possibly subject to other conditions.

Additionally, the computer system may permit follow requests from three or more users to be executed concurrently in some instances, such that the viewing perspective of a first user corresponds to the viewing perspective of a user that the first user has not explicitly requested to follow. For example, the first user may choose to follow a second user, and the second user may in turn choose to follow a third user. In this scenario, the first user and the second user would both adopt the viewing perspective of the third user, assuming that the follow requests from the first user and the second user are granted. Accordingly, the computer system may be configured to prevent cyclic dependencies from arising in situations where such dependencies are not readily apparent to the user making a follow request. In order to generate video streams for presentation to users, the computer system may collect and maintain information on the viewing perspectives of the users. The information maintained by the computer system can include information indicating a viewing direction specified by a particular user as well as information indicating whose perspective the particular user is following, if any.

Figure 1:
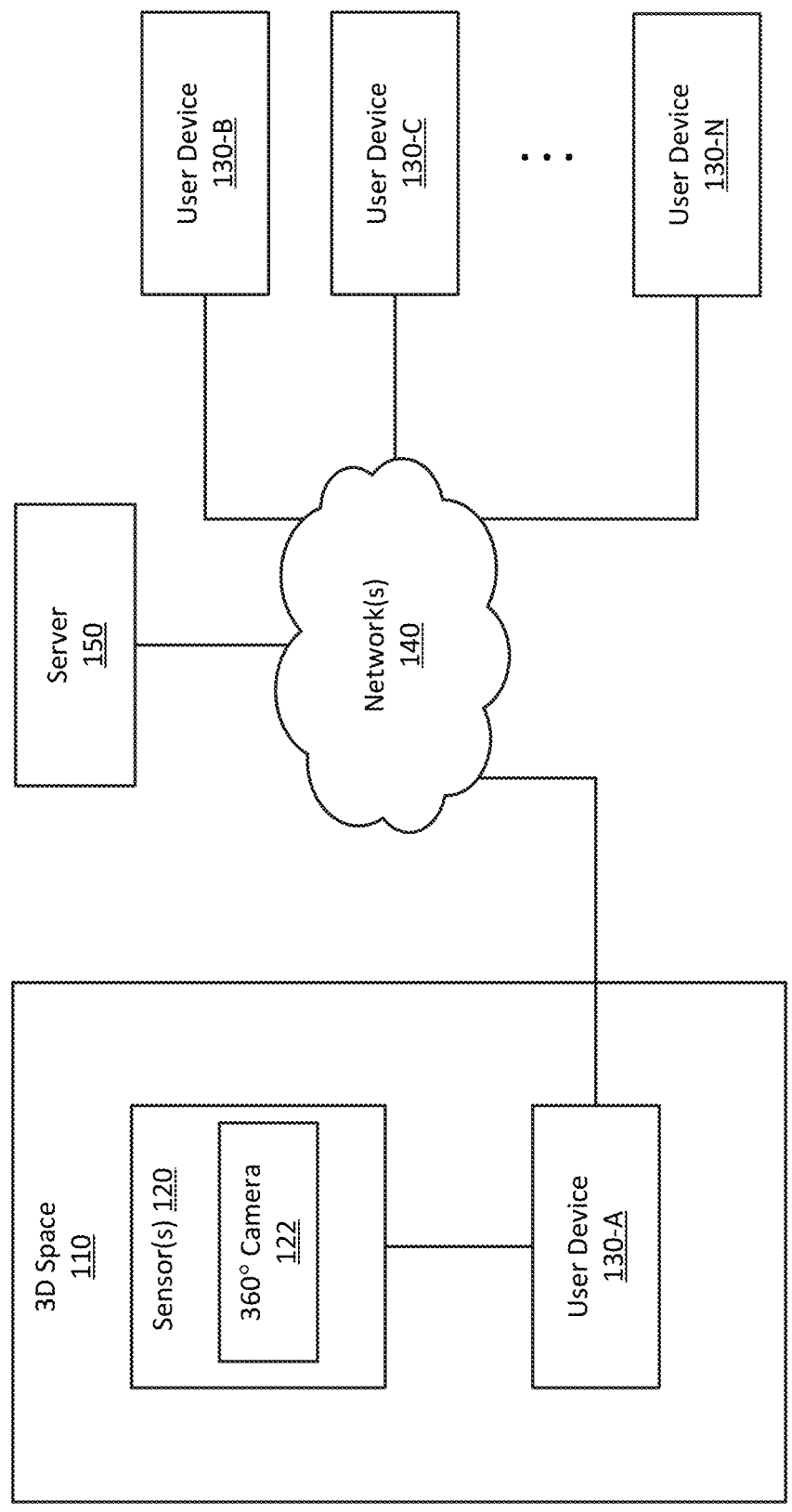
FIG. 1 is a block diagram of a computer system in which one or more embodiments may be implemented.

FIG. 1 is a block diagram of a system 100 in which one or more embodiments may be implemented. The system 100 includes a physical environment captured as part of a video stream for output to multiple users remotely located from each other. In the example of FIG. 1, the physical environment is a three-dimensional (3D) space 110 in which one or more sensors 120 are located. Embodiments of the present disclosure can be used for a variety of applications such as quality inspection (e.g., touring a factory floor), security (e.g., monitoring a building's premises), remote tourism (e.g., a virtual field trip), and the like. Other potential applications for the disclosed embodiments include, but are not limited to, automotive (e.g., viewing the cabin of a car and/or the environment outside the car), real estate (e.g., virtual tours of houses, commercial property, or indoor/outdoor lots), remote product demonstration, virtual commerce (e.g., showing products inside a physical retail store), virtual spectatorship (e.g., immersive viewing of sports events or music concerts), virtual classrooms, and remote conferences. Accordingly, the space 110 can represent any one of numerous types of physical environments, including indoor environments as well as outdoor environments.

As shown in FIG. 1, the sensor(s) 120 can include a 360° camera 122. An image captured by a 360° camera can correspond to a complete sphere or at least a circle around a horizontal plane. A 360° camera can include multiple lenses (e.g., a front lens and a back lens) and, in some cases, is formed using multiple camera devices or image sensors. For example, a 360° image can be generated by stitching together images captured by cameras that individually have less than a 360° field of view. Accordingly, the camera 122 can be a single device or multiple devices. Further, in some embodiments, camera 122 may be configured with a field of view that is less than 360°, for example, between 180° and 360°.

Camera 122 can be stationary, e.g., mounted on a stand. In some instances, camera 122 may be moved around the space 110 during operation. For example, the camera 122 can be mounted on a handheld tripod, and an operator of the camera 122 may carry the camera 122 while walking around the space 110. In some instances, the camera 122 may be attached to a gimbal so that the direction in which the camera 122 faces remains substantially fixed even if the camera is moved around.

Sensor(s) 120 can include other sensors besides camera 122. For example, the sensors 120 can include a non-360° camera. Other examples of sensors 120 include a microphone, other types of image sensors (e.g., an infrared camera), a radar sensor, a Light Detection and Ranging (LIDAR) sensor, an ultrasonic sensor, a gyroscope, a motion sensor, etc. The sensors 120 can be co-located (e.g., in the same device) or in different locations within the space 110. In some embodiments, the sensors 120 may include a user-facing camera integrated into a user device 130-A. As shown in FIG. 1, the user device 130-A is in the space 110 together with the camera 122. Thus, the user operating the user device 130-A can also be the operator of the camera 122.

User device 130-A is a computer device configured to receive sensor data from the sensor(s) 120, including at least a video stream from the camera 122. For instance, a video stream from the camera 122 can include digital images (e.g., red-green-blue (RGB) formatted images) that are encoded for transmission as an MPEG (Moving Picture Experts Group) video. Camera 122 may be configured to generate the video stream continuously and to transmit the video stream to the user device 130-A in real time using a wireless communications channel. For example, the camera 122 may send the video stream to the user device 130-A using a Bluetooth connection. In some implementations, at least some of the sensor data generated by the sensor(s) 120 is transmitted to the user device 130-A through wired communications, e.g., using a Universal Serial Bus (USB) interface.

In the example of FIG. 1, the user device 130-A is configured to collect the sensor data from the sensor(s) 120 and to forward the sensor data to a server 150 for processing and distribution to other user devices 130 (e.g., user devices 130-B, 130C, and 130-N). In particular, the server 150 may provide each of the other user devices with a copy of the video stream that was forwarded by the user device 130-A. As shown in FIG. 1, communication between the user devices 130 and the server 150 may be through one or more networks 140. The network(s) 140 can include, for example, the Internet, a cellular network (e.g., a 4G or 5G network), a wide area network (WAN), a local area network (LAN), or a combination thereof. Further, in some embodiments, the camera 122 may be configured to send video to the server 150 without the user device 130-A acting as an intermediary. For instance, the camera 122 can be implemented as a purpose-built computer device that includes a network interface card for communicating with the server 150 wirelessly or using a wire.

The users of the system 100 are the operators of the user devices 130. As mentioned above, the operator of the user device 130-A can also be the operator of the camera 122. In some instances, the operator of the user device 130-A is a meeting host responsible for setting up a videoconference for purposes of showing the space 110 to the other users. However, as indicated above, the camera 122 does not necessarily have to send video via the user device 130-A. Therefore, the user device 130-A could, like the other user devices 130-B, 130C, and 130-N, be located remotely from the space 110. In such instances, the camera 122 may be operated by someone who does not receive video from the server 150. Alternatively, in some instances, the camera 122 may be left to run unmanned, at least for the duration of a videoconference between the user devices 130.

The user devices 130 can be of the same type or include a mix of different types of computer devices, such as portable devices (mobile phones, tablets, laptops, etc.), non-portable devices (desktop computers, smart televisions, workstations, etc.), or a combination of portable and non-portable devices. In some embodiments, each user device 130 is configured to connect to the server 150 using a software application that is executed locally at the user device. For instance, the software application may be a videoconferencing application that permits a first user device (e.g., user device 130-A) to act as a host device and that also permits other user devices (e.g., user devices 130-B, 130-C, and 130-N) to act as guest devices.

In general, a user device 130 can be realized as a computer system including at least one processor, with the processor(s) being located on a single physical unit (e.g., sharing the same housing) or distributed across separately housed components that are communicatively coupled to each other. For example, in an artificial reality environment, a user device 130 may include a virtual reality headset and a console that executes program instructions to generate video content for display on the virtual reality headset. Accordingly, it will be understood that a user device 130 is not limited to a single physical device, although that may be the case in some instances, for example, in the case of a mobile phone or tablet.

Each user device 130 may include or be coupled to a display configured to present an output video stream generated using the video stream from the camera 122. The video stream from the camera 122 is an input video stream that can be processed (e.g., locally within each user device) to produce an output video stream for a particular user. The output video stream can be generated according to a viewing direction specified by the user. A user device can permit a user to control their own viewing direction, and therefore what portion of the space 110 that is captured by the camera 122 will be included in the output video stream. For example, while the camera 122 may have a 360° field of view, the output video stream that is displayed to a user may comprise images that have a narrower field of view (e.g., 100°).

In addition to causing an output video stream representing the space 110 to be presented to a user, each user device 130 may permit its user to participate in the videoconference using audio and/or video of the user. For example, each user device 130 may include a user-facing camera and/or a microphone configured to capture the voice of its user. Accordingly, users may be able to see and hear each other in addition to seeing (and possibly hearing) the space 110. As with the video from the camera 122, the server 150 may be configured to distribute video or audio of users to the user devices 130.

Server 150 can be implemented as a single computer or a network of computers. In some embodiments, server 150 may be a cloud-based server. The server 150 can be configured to transmit (e.g., broadcast) the video captured by the camera 122 to each user device 130 except the user device 130-A, since the user device 130-A supplies the video to the server 150 in the embodiment of FIG. 1. Additionally, the server 150 may be configured to provide each user device 130 with information indicating a viewing direction specified by a user of another user device 130. For example, server 150 may be configured to receive, from each user device 130, information on the current viewing direction associated with the user device and to broadcast this information to every other user device 130. Examples of ways in which information about viewing direction can be used to update an output video stream are described below.

Figure 2:
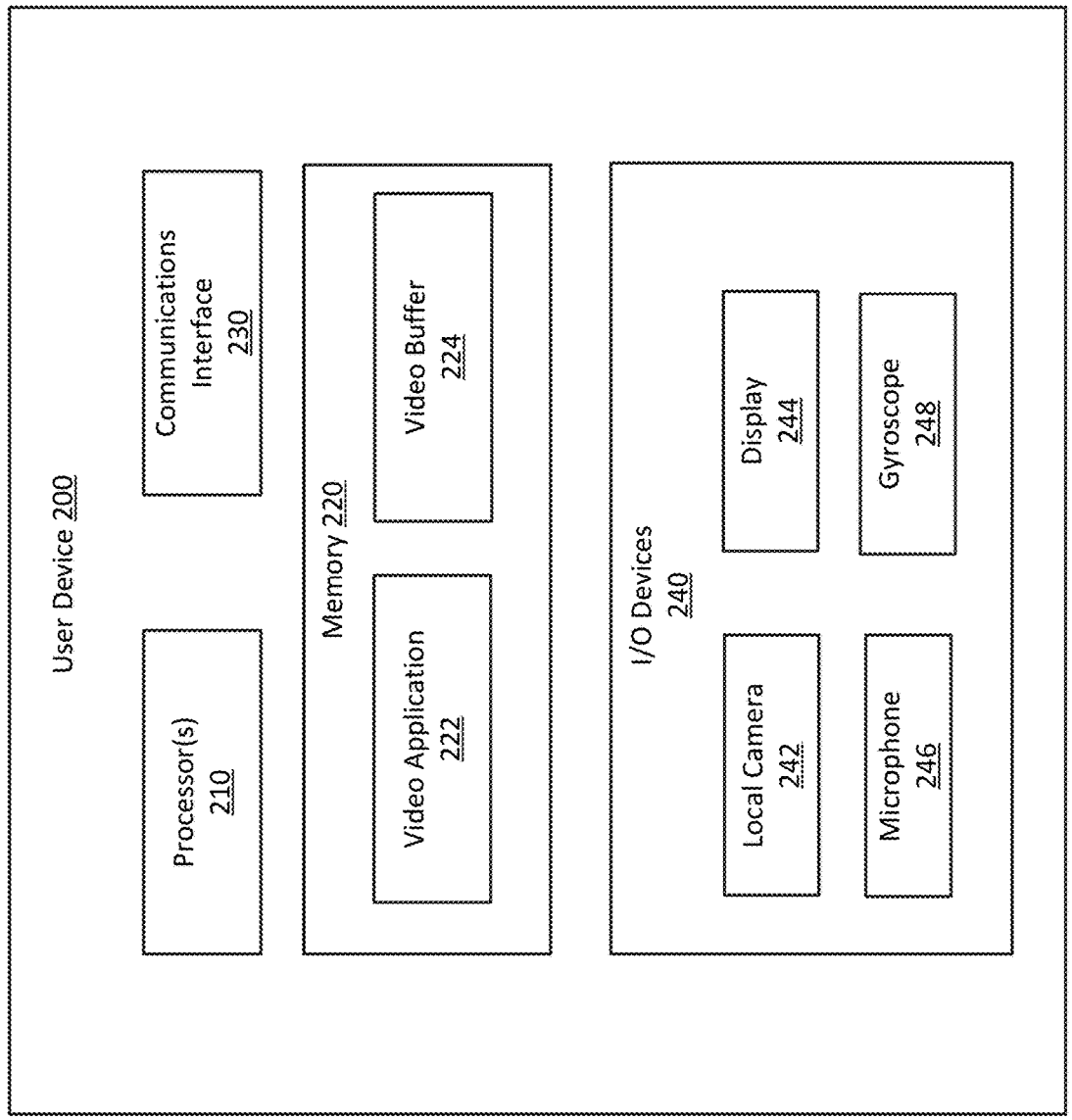
FIG. 2 is a block diagram of an example computer device usable for implementing one or more embodiments.

FIG. 2 is a block diagram of an example computer device (a user device) 200 usable for implementing one or more embodiments. For instance, the user device 200 can correspond to any of the user devices 130 in FIG. 1. User device 200 includes one or more processors 210, a memory 220, a communications interface 230, and input/output (I/O) devices 240. As discussed above, a user device can be configured to execute a software application for connecting to a server in connection with the sharing of video among multiple user devices. Accordingly, as shown in FIG. 2, the memory 220 may include a video application 222 that is executable by the processor(s) 210. The video application 222 may include program instructions that, when executed by the processor(s) 210, cause the user device 200 to connect to a remote server (e.g., server 150) for the purpose of providing the server with video for distribution to other user devices 200 and/or for receiving video from the server.

Processor(s) 210 can include one or more general purpose processors and/or special purpose processors. For instance, processors 210 can include a central processing unit (CPU) in combination with a graphics processing unit (GPU). Each processor 210 can include one or more processing cores that collectively form a multi-core processor. The processors(s) 210 may be configured to perform image processing operations on video. For example, a GPU may apply image processing techniques to a video stream received from a server to generate an output video stream for display on a display 244. An example of how an output video stream can be generated is discussed below in connection with FIGS. 3A and 3B.

Memory 220 may include a video buffer 224 for temporarily storing an input video stream and/or an output video stream. For example, the video buffer 224 can be configured to store an input video stream until the processor(s) 210 are ready to process the input video stream. Similarly, the video buffer 224 can be configured to delay (e.g., under the control of the video application 222) the transmission of an output video stream to the display 244 so that the output video stream is presented on the display 244 in synchronization with presentation of corresponding output video streams at other user devices 200. Memory 220 can be implemented using one or more types of memory (static random-access memory (SRAM), dynamic random-access memory (DRAM), read-only memory (ROM), etc.) and can include working memory for the processor(s) 210.

Communications interface 230 is configured to engage in wireless and/or wired communication with a remote device such as the server 150, another user device 200, or a peripheral device such as an I/O device 240. Communications interface 230 can be implemented in hardware and/or software and may, for example, include a network interface card or network controller configured to send data (e.g., a video stream) over the Internet using Transmission Control Protocol (TCP) and/or Internet Protocol (IP) packets. Communications interface 230 can be configured for wireless communications, for example, to establish a Bluetooth connection to the camera 122 in FIG. 1 or to access a WiFi network via a wireless router or access point. Thus, the communications interface 230 can include one or more antennas for transmitting a wireless signal and one or more antennas for receiving a wireless signal. Communications interface 230 can be configured for multiple communication modes. For example, the communications interface 230 may be capable of communicating with the server 150 through a WiFi network, a LAN, and a cellular network, and may be configured to use the cellular network as a default option when no WiFi network or LAN is available.

I/O device(s) 240 can include a local camera 242, a display 244, a microphone 246, a gyroscope 248, and/or other devices configured to permit the user device 200 to interact with a user and/or the environment around the user device 200. For example, in an automotive setting, the I/O devices 240 may include a radar sensor, a LIDAR sensor, an ultrasonic sensor, etc.

Local camera 242 can be used to capture images and/or video of a user. For instance, the camera 242 may be configured to capture video of a user operating the user device 200 for presentation to users of other user devices 200 as part of a video conference. In some embodiments, local camera 242 may be used to generate additional views of a 3D space such as the space 110, for example, to supplement the video generated by the 360° camera 122.

Display 244 is configured to present an output video stream to a user of the user device 200. In some embodiments, the display 244 may be integral to the user device 200. For example, display 244 can be a touchscreen on a mobile phone or tablet. In other embodiments, the display 244 may be a peripheral device such as a monitor connected to the user device 200 via a cable. As another example, the display 244 could be a virtual reality headset.

Microphone 246 can be used to capture the voice of a user and/or sound in the environment around the user device 200. For example, in a factory setting, it may be important for remote users to be able to hear the sound of machinery in addition to seeing the machinery. Accordingly, microphone 246 can be used as an additional source of sensor data relating to a space being viewed by remote users.

Gyroscope 248 is configured to generate information indicating the orientation of the user device 200. For instance, gyroscope 248 may be a three-axis gyroscope configured to measure rotation about three axes that are orthogonal to each other. The orientation of the user device 200 can be used as an input to the video application 222. For example, the video application 222 may be configured to set a viewing direction based on the device orientation.

Figure 3B:
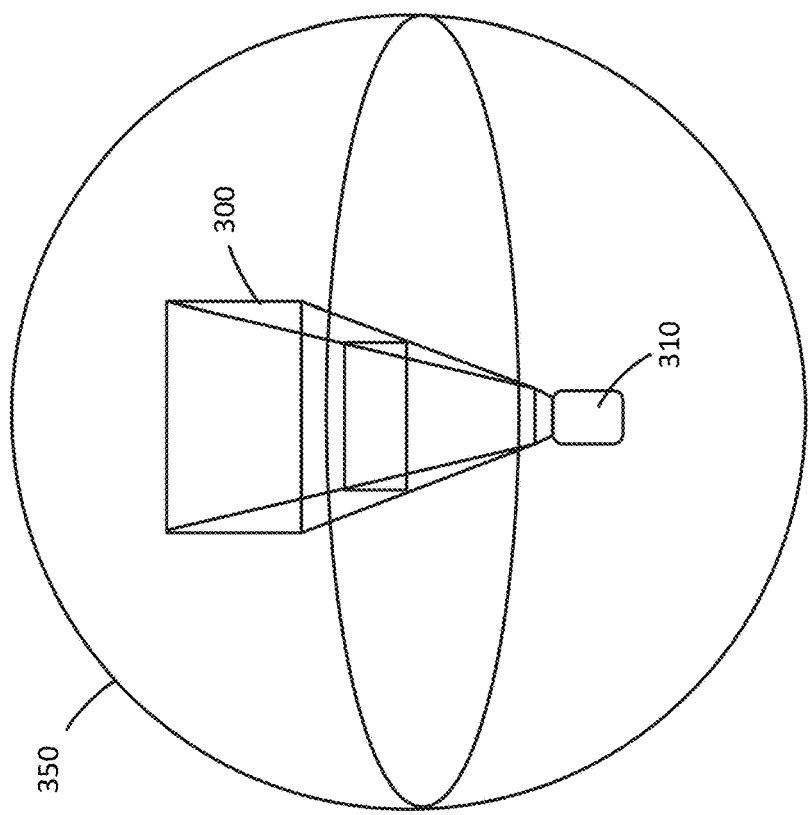
FIGS. 3A and 3B illustrate an example of a video stream being generated for use in conjunction with one or more embodiments.
Figure 3A:
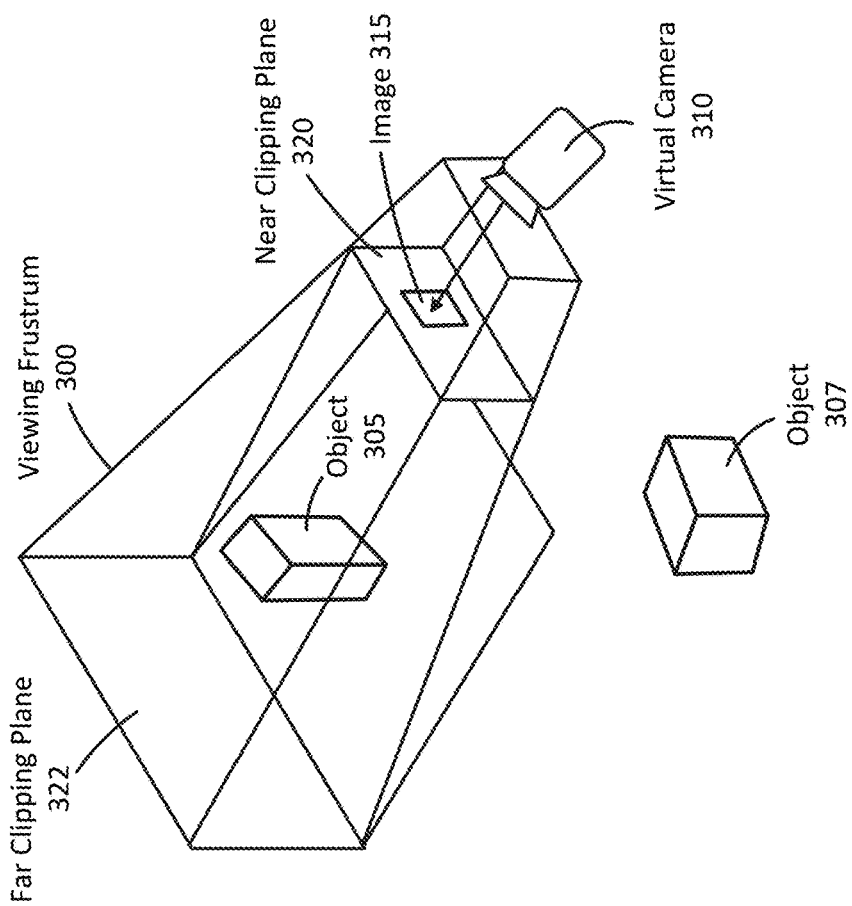

FIGS. 3A and 3B illustrate an example of a video stream being generated for use in conjunction with one or more embodiments. The functionality depicted in FIGS. 3A and 3B can be implemented through processing performed by one or more computer devices. For instance, each user device 130 in the system 100 may be configured to generate an output video stream for presentation to a respective user, through local processing of an input video stream captured using the camera 122 and in accordance with the viewing-frustrum-based technique described below.

In FIGS. 3A and 3B, an output video stream having a narrower field of view is generated from an input video stream having a wider field of view. As shown in FIG. 3A, images that form an output video stream can be determined based on a viewing direction, which is the direction in which a virtual camera 310 is facing. When a user device connects to a video sharing session (e.g., a videoconference), the direction of the virtual camera 310 may initially be set to the direction of the physical camera generating the input video (e.g., the camera 122 of FIG. 1). The user can change the direction of their virtual camera, for example, by physically rotating their device in a certain direction to make the virtual camera follow that direction. Accordingly, the virtual camera 310 may represent the viewing perspective of a particular user.

Output images can be determined based on a viewing frustum 300 oriented along the viewing direction. The viewing frustum 300 is characterized by a near clipping plane 320 and a far clipping plane 322. In general, an object 305 located within the viewing frustum 300 will be rendered visible by projecting the object 305 onto an image plane of the virtual camera 310 (in this example, the near clipping plane 320) to form an image 315 for inclusion in the output video stream. Objects that are closer to the virtual camera 310 than the near clipping plane 320 or farther away than the far clipping plane 322 will not be rendered. Thus, objects located beyond the viewing frustum (e.g., an object 307) will not be visible even if such objects are captured as part of the input video stream. Additionally, in some implementations, the output video stream can be generated by placing the virtual camera 310 in the center of a skybox that surrounds the virtual camera 310 on all sides. The skybox defines the farthest point that is rendered in the viewing frustum, which may or may not be a point along the far clipping plane 322. The skybox can be used to provide a background image (e.g., a texture background) against which captured objects are rendered.

FIG. 3B shows the viewing frustum 300 as corresponding to a region within a sphere 350. The sphere 350 represents the entire 360° field of view of the camera 122. The virtual camera 310 is located at the center of the sphere 350, at the same position as the camera 122. However, the virtual camera 310 can be rotated to face a different direction. For instance, a user may be able to rotate their virtual camera to show one or more of the objects in the sphere 350, e.g., the object 307 or the object 305, but not both objects at the same time depending on the angular distance between the objects 305 and 307. For the sake of simplicity, the objects 305 and 307 are omitted from the depiction of the sphere 350.

Figure 4:
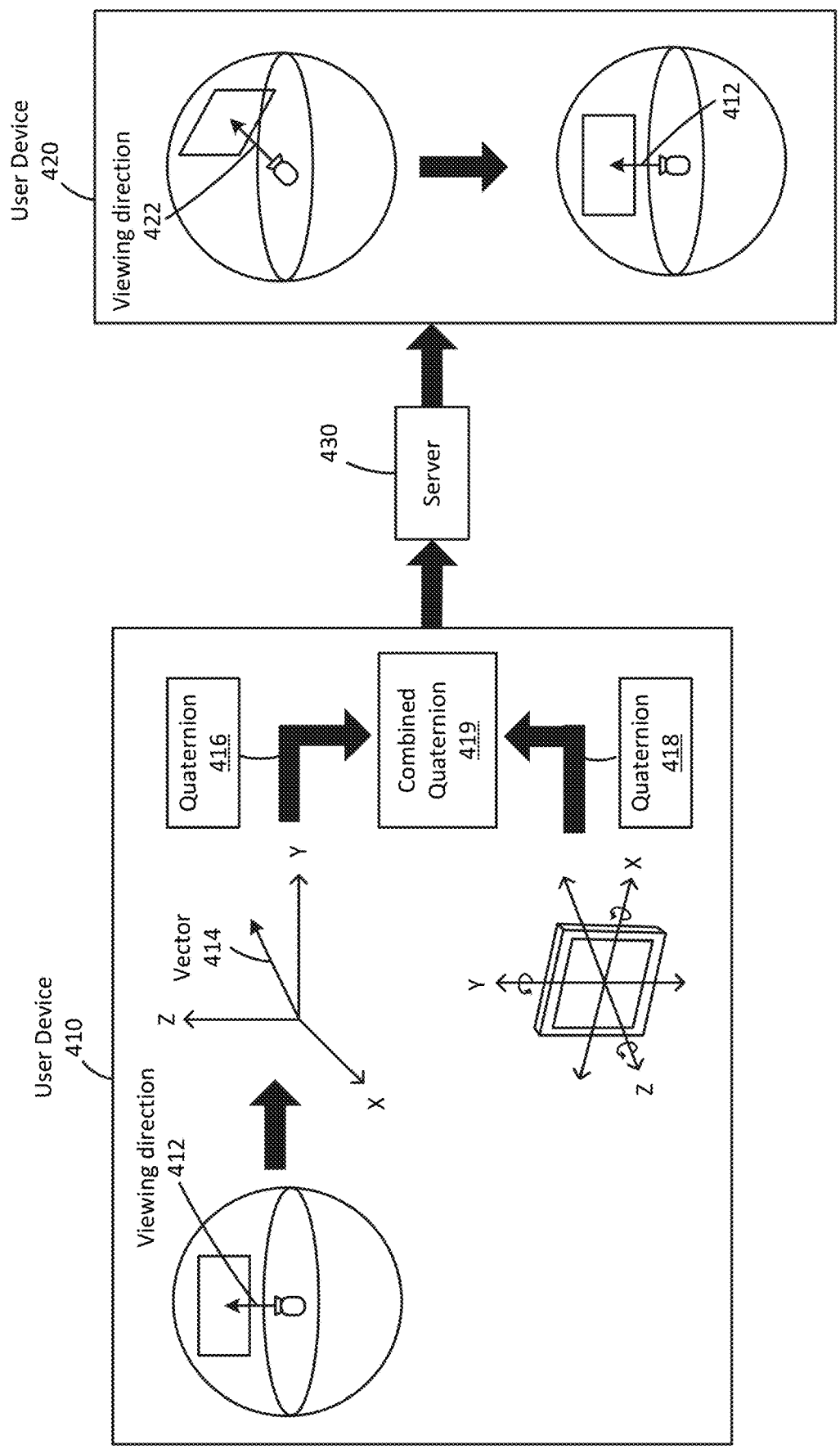
FIG. 4 illustrates an example of a process for updating an output video stream of a first user based on a viewing direction of a second user.

FIG. 4 illustrates an example of a process for updating an output video stream of a first user based on a viewing direction of a second user. The process depicted in FIG. 4 involves steps performed by a first user device 410, a second user device 420, and a server 430. The server 430 can correspond to server 150 in FIG. 1. The user devices 410 and 420 can correspond to any two user devices 130 in FIG. 1. For instance, the user device 410 could be a host device (e.g., user device 130-A) and the user device 420 could be a guest device (e.g., user device 130-B). Alternatively, the user device 410 could be a guest device and the user device 420 could be a host device. Further, in embodiments where the camera 122 can communicate with the server 150 without going through a host device, both of the user devices 410 and 420 could be guest devices.

As shown in FIG. 4, a viewing direction 412 has been specified for the user device 410. For example, the viewing direction 412 can be specified through user input to a graphical user interface provided by the user device 410. The viewing direction 412 can be represented as a vector 414 in a 3D coordinate system, e.g., a Cartesian coordinate system with an X-axis, a Y-axis, and a Z-axis. The user device 410 may generate a quaternion 416 for the vector 414. A quaternion is a numerical representation comprising a set of real-numbered coefficients for a four-dimensional vector space. Quaternions are sometimes used for performing calculations involving rotations in 3D space and are typically expressed as the sum of a real component and three imaginary components.

In the example of FIG. 4, the quaternion 416 represents an angular rotation needed to transform a default or initial direction vector (e.g., a vector representing the direction of the camera 122 or other physical camera capturing video of a 3D space) into the vector 414. If the 3D coordinate system is a Cartesian coordinate system, then the angular rotation can be expressed as a rotation about an axis defined by a unit direction vector, where the unit direction vector is encoded using an X value, a Y value, and a Z value. The rotation about the axis of the unit direction vector can be expressed as an angle W. For example, if the quaternion is the set of values (W, X, Y, Z) then the unit direction vector can be defined as $$\left( \frac{X}{\sin\left(\frac{\Omega}{2}\right)}, \frac{Y}{\sin\left(\frac{\Omega}{2}\right)}, \frac{Z}{\sin\left(\frac{\Omega}{2}\right)} \right), \text{ where } W = \cos\left(\frac{\Omega}{2}\right).$$

Additionally, in the example of FIG. 4, the viewing direction based on which an output video stream is generated for the user of the user device 410 corresponds to the viewing direction 412 as modified based on the orientation of the user device 410. In other words, a user device can be configured to provide its user with multiple ways to specify viewing direction, and a "final" viewing direction can be a result of combining different types of user input. For example, in some embodiments, the user of the user device 410 may specify the viewing direction 412 by swiping a finger across a touchscreen or using some other form of touch input to trigger panning of a virtual camera, e.g., toward the direction of the finger swipe. The viewing direction 412 can be modified to form the final viewing direction by changing the orientation of the user device 410 independently of performing the finger swipe. For example, the user may physically rotate the user device 410 in order to pan the virtual camera in the direction of the physical rotation. Accordingly, as shown in FIG. 4, the user device 410 can calculate a combined quaternion 419 representing an angular rotation needed to transform the default or initial direction vector to a vector associated with the final viewing direction. The combined quaternion 419 can be calculated as a product of multiplying the quaternion 416 with a quaternion 418 representing the orientation of the user device 410. As discussed earlier, device orientation can be determined using a gyroscope, e.g., to capture rotation about the X, Y, and Z axes. The multiplication operation may involve multiplying a matrix representation of the quaternion 416 with a matrix representation of the quaternion 418. An example of such a matrix representation is discussed below in connection with generating a rotated vector.

The combined quaternion 419 can be applied to an input video stream to derive an output video stream corresponding to the final viewing direction for output on a display controlled by the user device 410. In some embodiments, the generation of an output video stream involves using a combined quaternion to determine a rotated vector with XYZ components, determining a viewing frustum based on the rotated vector (e.g., the rotated vector can be extended to form an imaginary line connecting the center points of the near and far clipping planes), and using the viewing frustum to determine which region of a 3D space captured on video should be rendered for display at a user device. The rotated vector points in the final viewing direction and can be a result of applying a geometric transformation to a default or initial vector (e.g., a vector pointing in the direction of the camera 122). For example, if the default vector has values $(X_2, Y_2, Z_2)$, a rotated vector Qv can be calculated as the product of multiplying the default vector with a matrix derived from the values of the combined quaternion 419, as follows:

$$Q_v = \begin{bmatrix} 1-2y^2-2z^2 & 2xy-2zw & 2xz+2yw \\ 2xy+2zw & 1-2x^2-2z^2 & 2yz-2xw \\ 2xz-2yw & 2yz+2xw & 1-2x^2-2y^2 \end{bmatrix} \begin{bmatrix} x_2 \\ y_2 \\ z_2 \end{bmatrix}$$

In addition to being used for generating an output video stream at the user device 410, the combined quaternion 419 can be transmitted to the server 430, possibly together with other viewing direction information such as the quaternions 416 and 418, for distribution to other user devices such as the user device 420. A user of the user device 420 can specify their own viewing direction in the same manner as described above with respect to determining the final viewing direction for the user device 410. For example, the user device 420 may permit its user to specify a viewing direction in multiple ways that collectively determine which direction is used for generating an output video stream at the user device 420. Thus, the user device 420 can be set to a viewing direction that is different than that of the user device 410. By sending information indicating the viewing direction for another user device (e.g., sending the combined quaternion 419), the server 430 can inform the user device 420 about which region of a 3D space the user of the other user device is currently able to see.

As mentioned above, a computer system configured in accordance with an embodiment of the present disclosure may permit a user to adopt the viewing perspective of another user in some circumstances. In FIG. 4, this is shown as a switch from a viewing direction 422 specified through the user device 420 to the viewing direction 412 (as modified based on the rotation of the user device 410). Accordingly, FIG. 4 represents a scenario in which the user operating the user device 420 has chosen to follow the user operating the user device 410.

In some embodiments, switching of viewing directions involves processing performed by a user device that receives a follow request. Such processing may be performed using information received by the user device regarding the viewing direction associated with the user who is being followed. For example, the user device 420 may receive the combined quaternion 419 from the server 150 prior to a follow request. At the time of the follow request, the user device 420 may be presenting a video stream that is being generated based on a quaternion corresponding to the viewing direction 422. Upon granting the follow request, the user device 420 may switch to using the combined quaternion 419 in order to update the video stream to correspond to the perspective of the user operating the user device 410.

Substituting the combined quaternion 419 would result in an output video stream that is substantially identical to that which is presented to the user of the user device 410. To generate an output video stream using the combined quaternion 419, the user device 420 can be configured to perform processing similar to that described above with respect to forming an output video stream at the user device 410 including, for example, using the combined quaternion 419 to determine a rotated vector and a corresponding viewing frustrum, then using the viewing frustrum to determine which region of the 3D space is visible.

Figure 5:
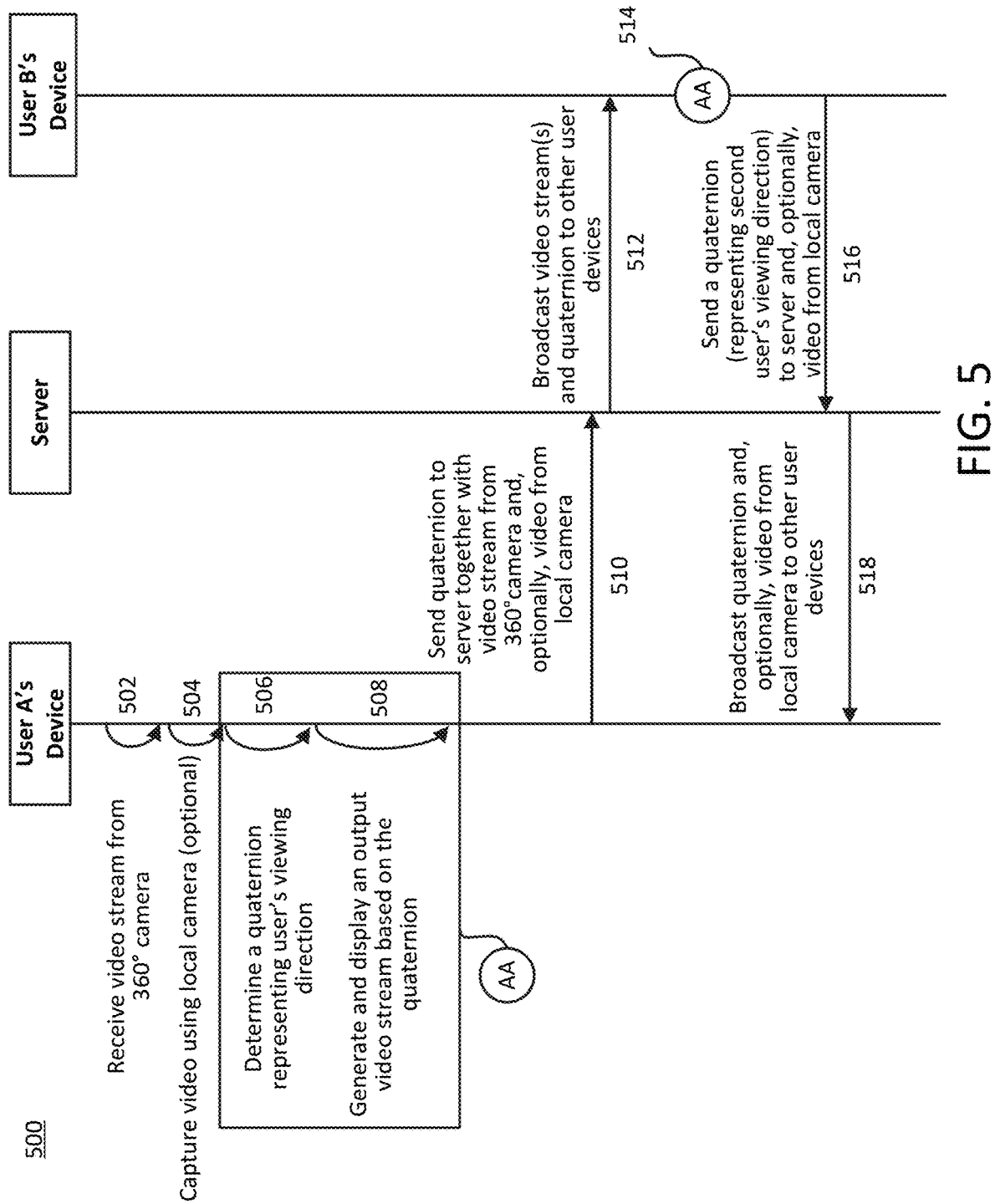
FIG. 5 is a flow diagram of a process for communicating information indicating a viewing direction associated with a user device.

FIG. 5 is a flow diagram of a process 500 for communicating information indicating a viewing direction associated with a first user device. The process 500 can be performed to supply a second user device with information that allows a user of the second user device (User B) to adopt the viewing perspective of a user of the first user device (User A), but subject to the prohibition against cyclical following described below. The functionality in FIG. 5 may be implemented using a server (e.g., server 150) that is communicatively coupled to the user devices. The information communicated by the server can include, among other things, a quaternion associated with the first user device. Similarly, the server may communicate a quaternion associated with the second user device to the first user device, thereby allowing User A to adopt the viewing perspective of user B, also subject to the prohibition against cyclical following.

At step 502, the first user device receives a video stream from a 360° camera. In the example of FIG. 5, the first user device may correspond to the user device 130-A in FIG. 1. The video stream received in step 502 may include 360° images of a 3D space. Alternatively, the video stream in step 502 may have a narrower field of view (e.g., greater than 180° but less than 360°). The 360° camera may be configured to continuously generate and transmit the video stream to the first user device, e.g., using a wireless or wired connection.

At step 504, the first user device optionally captures video using a local camera. For example, the local camera can be used to capture additional video of the 3D space and/or to capture video of User A. The video capture in step 504 can be performed concurrently with capturing of the video that is received in step 502.

Steps 506 and 508 (collectively labeled "AA") correspond to processing that produces an output video stream for display to User A. At step 506, the first user device determines a quaternion representing User A's viewing direction. The viewing direction represented by the quaternion of step 506 can be a function of multiple user inputs. For example, as discussed above in connection with FIG. 4, a user may be provided with the ability to set a viewing direction through a combination of finger swiping and changing the orientation of their user device. Other types of user input are also possible depending on what type of user interface(s) are available. For example, if the first user device is equipped with a mouse or touchpad, the viewing direction may be specified by moving the mouse or swiping the touchpad toward a desired viewing direction. Accordingly, the quaternion in step 506 can be a result of combining two or more quaternions, e.g., multiplying two quaternions to produce a combined quaternion such as the combined quaternion 419 in FIG. 4.

At step 508, the first user device generates an output video stream based on the quaternion determined in step 506. As discussed above, an output video stream can be generated based on a viewing frustrum derived from a quaternion. After generating the output video stream, the first user device causes the output video stream to be presented on a display to User A. For example, the output video stream can be presented on the same touchscreen that is used by User A to set the viewing direction.

At step 510, the first user device sends the quaternion from step 506 to the server together with the video stream received from the 360° camera in step 502. Optionally, the first user device may send a video captured by the local camera in step 504 (e.g., video depicting User A). Other sensor data collected by the first user device, such as audio of User A, can also be sent in step 510.

At step 512, the server broadcasts the video stream(s) received in step 510 to other user devices (e.g., the second user device) that are participating in a video sharing session with the first user device. The broadcast in step 512 can also include the quaternion from step 506. In this manner, the other user devices may receive information indicative of the viewing direction associated with the first user device.

At step 514, the second user device may perform steps analogous to those performed by the first user device in steps 506 and 508. In particular, the second user device can be configured to permit User B to specify their own viewing direction and to generate an output video stream accordingly. The display of the output video stream generated by the first user device can be synchronized with the display of the output video stream generated by the second user device, so that both users are provided with the experience of seeing the 3D space at the same time even though the users may be in different locations (e.g., User A may be on-site at the 3D space and User B may be at home).

Step 516 is analogous to step 510. At step 516, the second user device sends a quaternion representing the viewing direction of User B to the server and, optionally, video from a local camera of the second user device. However, step 516 does not involve sending the video stream that was captured by the 360° camera since this is provided to the server by the first user device (or by the 360° camera itself, in some embodiments). Accordingly, the second user device in the example of FIG. 5 may correspond to user device 130-B or some other user device besides the user device 130-A.

At step 518, the server broadcasts the quaternion from step 516 to other user devices (e.g., to the first user device, as shown). Thus, the first user device can receive information indicating the viewing direction of User B, similar to how the second user device receives information indicating the viewing direction of User A. The broadcast in step 518 can optionally include video captured by the local camera of the second user device (e.g., video depicting User B).

In the example of FIG. 5, the second user device may provide User B with an option to follow another user that the second user device has received viewing direction information about. For instance, the second user device may be configured to present a graphical user interface with an option to initiate a follow request for following User A. When User B has chosen to follow User A, the second user device may apply the most recent information it has received regarding the viewing direction of User A, e.g., the quaternion received during the broadcast in step 512. Likewise, the first user device may be configured to present a graphical user interface with an option to initiate a follow request for following User B, e.g., based on the quaternion received during the broadcast in step 518. Examples of such user interfaces are shown in FIGS. 6A to 6C, described below.

Upon receiving a follow request, a user device may check whether the follow request would result in a cyclic dependency. A cyclic dependency may arise when a series of follow requests from two or more users causes the viewing direction used to generate an output video stream for one of the two or more users to revert back to the viewing direction of that same user. For example, a follow request from User A in FIG. 5 produces a cyclic dependency when the follow request switches the viewing direction of the first user device back to the viewing direction of User A. Similarly, a follow request from User B produces a cyclic dependency when the follow request switches the viewing direction of the second user device back to the viewing direction of User B. When a cyclic dependency occurs, the user device processing the follow request may not be able to determine which user's perspective should be the governing perspective from which an output video stream should be generated. The user device may enter an infinite programming loop in which the user device repeatedly cycles through a chain of users in an attempt to conclusively determine who to follow. Because the chain is circular, the user device may be unable to identify a valid viewing direction, leading to unexpected system behavior. For instance, the user devices of all the users in the chain may lock onto the perspective of a particular member of the chain, with the result being that none of the users in the chain are able to change perspectives until the chain is broken, e.g., until one of the users in the chain cancels their follow request. To prevent such a scenario, a user device receiving a follow request may deny (e.g., ignore) the follow request when the follow request creates a cyclic dependency.

Figure 6A:
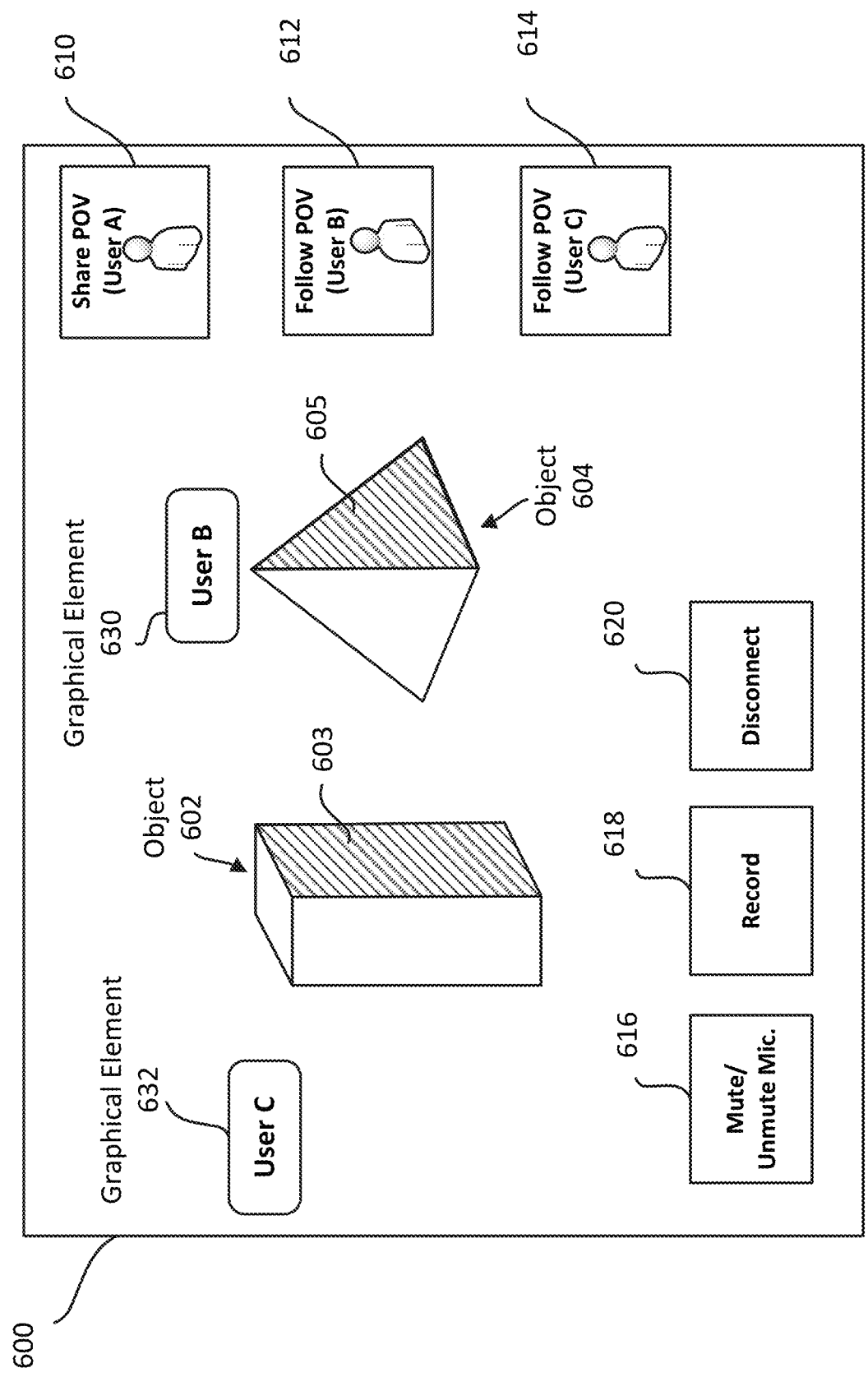
FIGS. 6A to 6C illustrate an example sequence of graphical user interfaces generated in response to user activity, according to some embodiments.
Figure 6B:
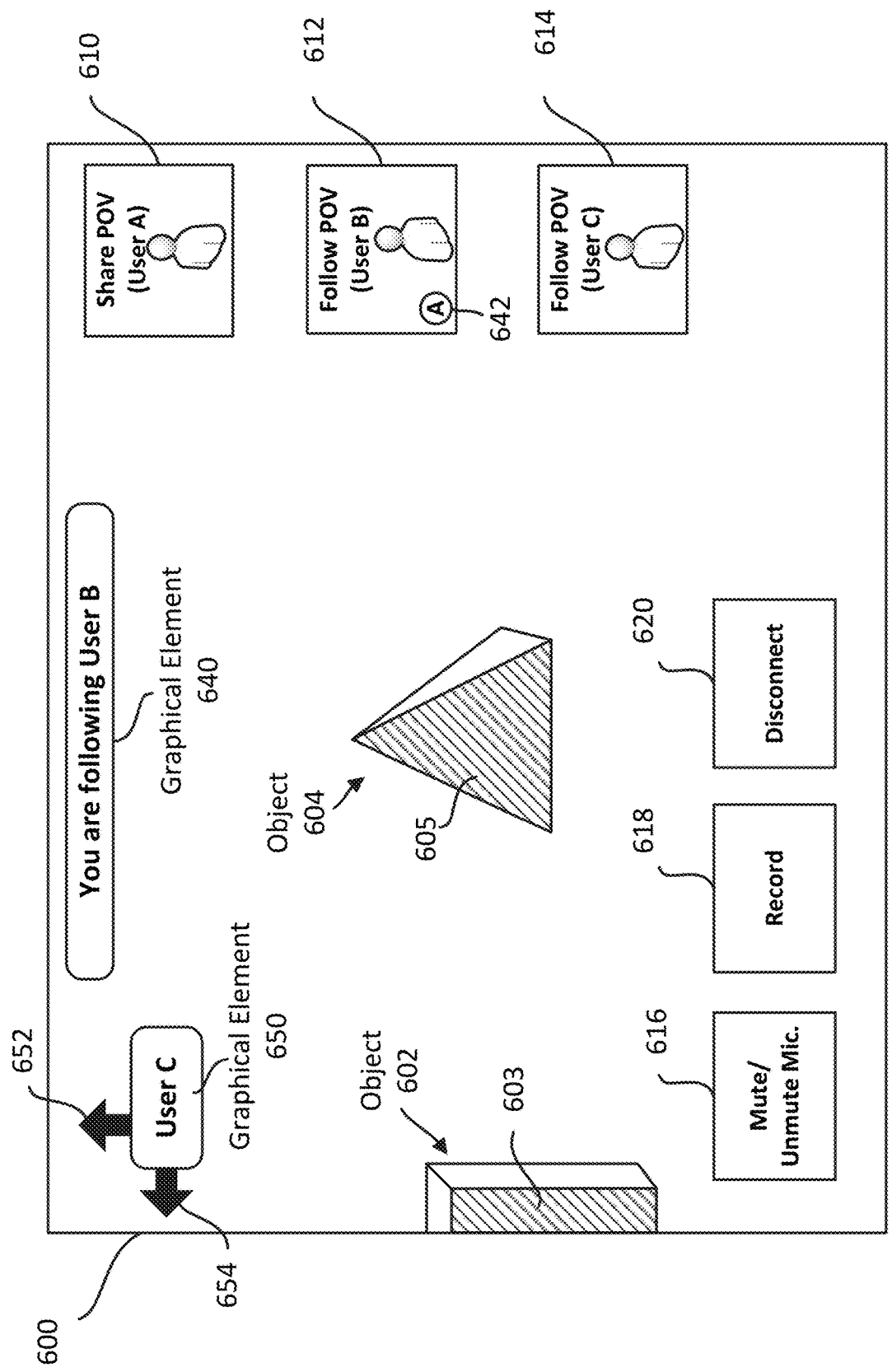
Figure 6C:
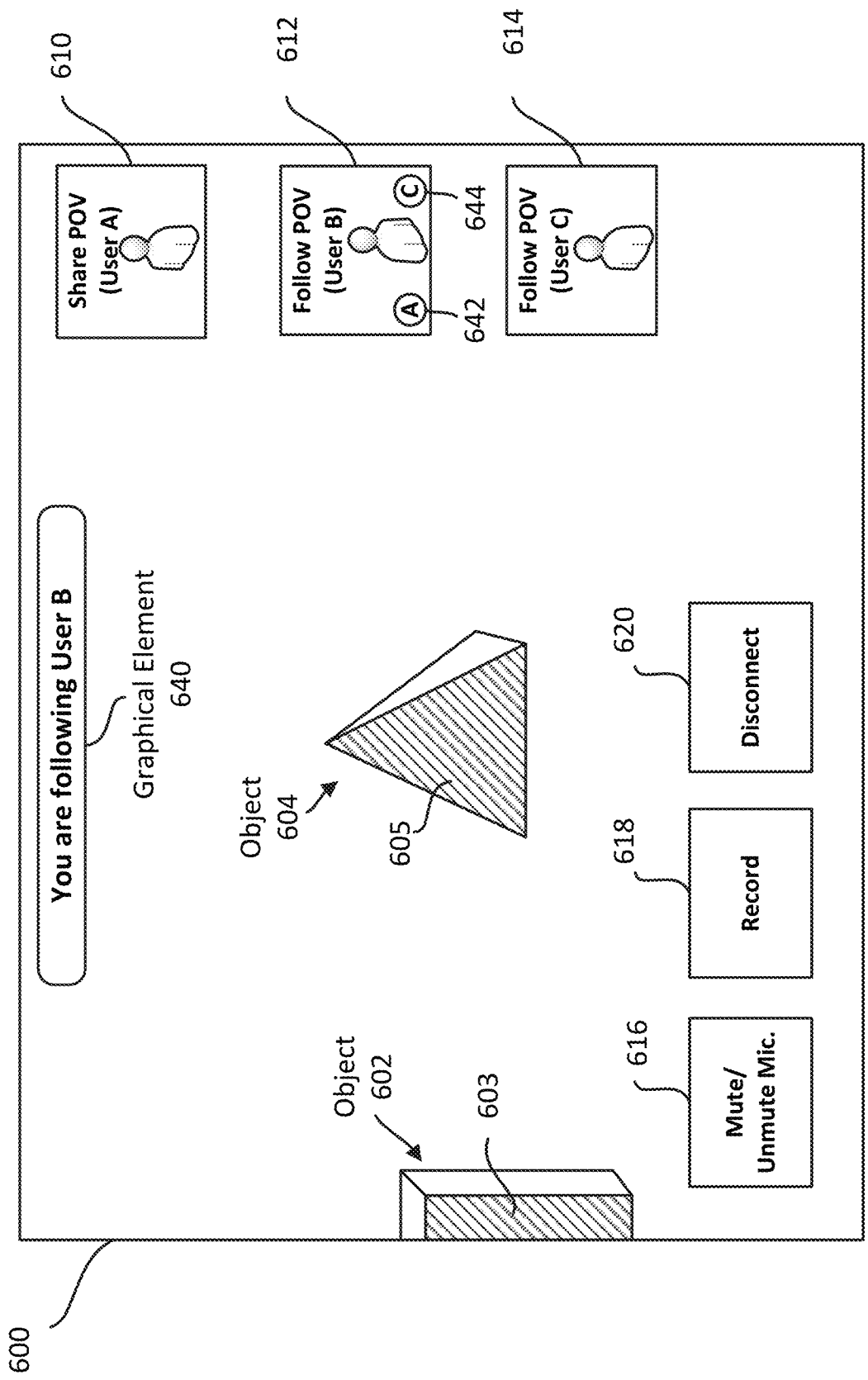

FIGS. 6A to 6C illustrate an example sequence of graphical user interfaces (GUIs) generated in response to user activity, according to some embodiments. The sequence of GUIs in FIGS. 6A to 6C represents consecutive updates to a graphical user interface that is output to the same user (User A). The GUIs are generated in response to a follow request from User A and further in response to follow requests from other users (User B and User C).

FIG. 6A illustrates an example GUI 600 according to certain embodiments. The GUI 600 may be generated by a user device, e.g., through execution by one or more processors 210 of instructions associated with the video application 222. In this example, the user device is operated by User A. The GUI 600 is configured to present an output video stream to User A, e.g., rendered on the display 244. Similar GUIs may be generated by other user devices in communication with User A's device. In FIG. 6A, the output video stream is generated based on a viewing direction specified by User A and depicts a first object 602 and a second object 604 from User A's perspective.

The GUI 600 can include graphical elements that indicate where other users are looking. For example, FIG. 6A shows a graphical element 630 indicating where User B is looking and a graphical element 632 indicating where User C is looking. The graphical elements 630 and 632 can be generated based on information received by User A's device regarding the viewing directions of User B and User C, e.g., quaternion information broadcast by the server 150. The graphical elements 630 and 632 serve to annotate the scene depicted in User A's output stream and are positioned to indicate where User B and User C are currently looking. In this example, User B and User C are both viewing areas of a 3D space that are currently visible from the viewing perspective of User A. That is, User B and User C are looking at parts of the scene that are currently being displayed in the output video stream of User A.

GUI 600 can include any number of user selectable options, which can be in the form of buttons, toolbars, dropdown menus, checkboxes, and/or the like. The options can be presented in the same window as the output video stream, e.g., along the edges of the window as shown in FIG. 6A. Accordingly, the options may be overlaid or superimposed onto the scene being rendered. In some embodiments, one or more options may be displayed in a separate window or frame, e.g., through a popup menu. The options presented by the GUI 600 may permit User A to interact with the video application 222 and thereby participate in a videoconference with User B and User C. For example, GUI 600 may include an option 616 to toggle muting of a microphone connected to User A's device, an option 618 to record the content being shown through the GUI 600 (e.g., the scene including the objects 602 and 604), and an option 620 to disconnect from the videoconference.

GUI 600 may further include options for sharing video content between users. For example, the GUI 600 can include an option 610 for sharing User A's perspective or point of view (POV), an option 612 to follow User B, and an option 614 to follow User C. The options 610, 612, and 614 may include graphical representations of their respective users. For instance, in some embodiments, the option 610 may include an avatar image representing User A, the option 612 may include an avatar image representing User B, and the option 614 may include an avatar image representing User C. In other embodiments, the options 610, 612, and 614 may display actual images of their respective users, e.g., a static image or live video stream captured through the user's local camera 242. Accordingly, the GUI 600 may be configured to permit users to see each other while also viewing the same 3D space concurrently.

The options 610, 612, and 614 may be implemented as buttons that can be activated through input from User A, e.g., through clicking with a mouse cursor or tapping on a touchscreen. Selecting option 610 may cause the output video streams being generated for other users (e.g., User B and User C) to be generated based on the viewing direction of User A. In this manner, User A can share his or her perspective with the other users. In some instances, User A may wish to view the scene from the perspective of another user. Accordingly, User A may select option 612 to switch to using the viewing direction of User B for generating the output video stream. Likewise, User A may select option 614 to switch to using the viewing direction of User C for generating the output video stream.

FIG. 6B shows the GUI 600 after being updated based on selection of the option 612. In response to User A selecting option 612, the output video stream being generated for User A is no longer generated based on User A's viewing direction but is instead generated based on User B's viewing direction. For example, FIG. 6B shows that User B's virtual camera is facing a side 603 of the object 602 and a side 605 of the object 604 from a different angle than User A's virtual camera. Further, because User B's virtual camera is rotated with respect to User A's virtual camera, the portion of the 3D space visible to User B (and User A following User B) is different from the portion of the 3D space shown in FIG. 6A. For example, only part of the object 602 is onscreen in FIG. 6B.

When the viewing direction is changed, the graphical elements that indicate where other users are looking can be updated accordingly. For example, the graphical element 630 is not displayed in FIG. 6B because User A's viewing direction and User B's viewing direction are now the same. Further, as shown in FIG. 6B, User C is looking at an area that is offscreen from the perspective of User B. The viewing direction of User C is indicated by a graphical element 650 that includes one or more directional indicators pointing toward where User C is looking. For example, the graphical element 650 can include an arrow 652 and an arrow 654 that collectively provide a general indication of User C's viewing direction.

FIG. 6B also shows the GUI 600 updated to display an indication of a follow status of User A. For instance, the GUI 600 now includes a graphical element 640 containing a message indicating that User A is currently following User B. Additionally, the option 612 has been updated to include a graphical element 642 associated with User A. In the example shown, the graphical element 642 is an icon with a label "A." Depending on implementation, other labels may be applied, such as a name, a numeral, or some other identifier associated with User A. In some embodiments, each user may be assigned a color. For example, User A may be assigned red, User B assigned green, and User C assigned blue. Accordingly, the icon 642 can be a red circle, and the option 610 may be displayed using a red background to enable User A to visually correlate their assigned color to the color of the icon 642.

In some embodiments, indicators of follow status may be presented on the GUIs of other users so that each user is aware of who other users are following. For instance, in response to selection of the option 612 by user A, a GUI presented to User B can be updated to include a similar icon 642 so that User B is aware that he or she is being followed by User A. Alternatively, the GUI presented to User B may not be updated, so that the only user aware that User A is following User B is User A. However, information indicating the current viewing direction for User A may still be communicated to User B's device in order to permit User B's device to detect cyclic dependencies. In general, each user device is aware of the viewing directions of every user and is also aware of which users are being followed.

FIG. 6C shows a further update to the GUI 600 sometime after the events depicted in FIG. 6B. Thus, FIGS. 6A, 6B, and 6C represent a series of consecutive updates to a GUI presented to User A. In FIG. C, the GUI 600 has been updated based on a follow request from User C. As indicated above, user devices may communicate information to each other (e.g., via a server such as the server 150) so that every user device is aware of the current status of every user, including what the viewing direction of each user is (e.g., in the form of quaternion values) and also who the user is following, if any. Accordingly, the update in FIG. 6C can be performed in response to User A's device being informed that a follow request has been granted for another user (User C in this example). As shown in FIG. 6C, the option 612 has been updated to include a graphical element 644 similar to the graphical element 642 described above. The graphical element 644 is associated with User C and is displayed together with the graphical element 642 to indicate that both User A and User C are currently following User B.

FIGS. 6A to 6C depict a relatively simple following scenario in which there is no indirect following of another user. In the example just described, User A and User C have each explicitly requested to follow User B. However, there may be times when a first user indirectly follows another user because the user who the first user has requested to follow is in turn following someone else. Cyclic dependencies that arise during indirect following scenarios are problematic because such dependencies are difficult for a user to manually identify, especially as the length of the user chain grows. Further, even if users are made aware of who everyone is following, it can be tedious to manually trace through all the links in the chain to determine whether a follow request would create a cyclic dependency. The user experience would be significantly improved if cyclic dependencies were automatically detected and prevented, since users could then freely make follow requests without concerning themselves with determining whether the follow requests would lead to unexpected system behavior.

Figure 7:
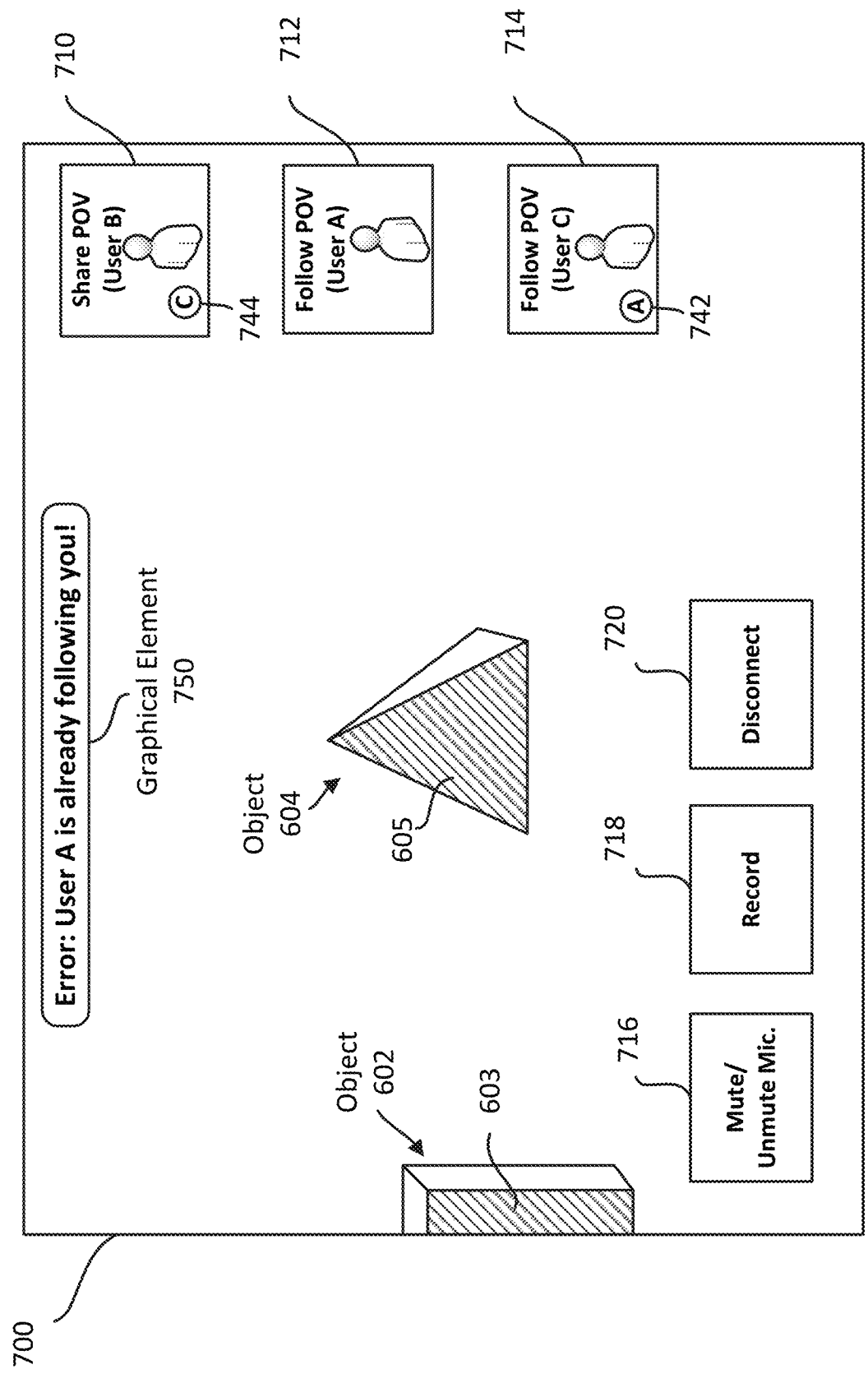
FIGS. 7 and 8 illustrate example graphical user interfaces reflecting an attempt to follow a user in a cyclical manner, according to some embodiments.

FIG. 7 illustrates an example GUI 700 reflecting an attempt to follow a user in a cyclical manner, according to some embodiments. The GUI 700 is generated for presentation to User B and includes user interface elements similar to those of the GUI 600. For instance, the GUI 700 is shown as including an option 716 to toggle muting of a microphone connected to User B's device, an option 718 to record the content being shown through the GUI 700, and an option 720 to disconnect from the videoconference. Further the GUI 700 includes options for sharing video content between users. In particular, GUI 700 includes an option 710 for sharing User B's perspective, an option 712 to follow User A, and an option 714 to follow User C. As shown in FIG. 7, the options 710, 712, and 714 are arranged to show the users in a different order than the GUI 600. For instance, each GUI may be configured so that an avatar, image, or other representation of the user for whom the GUI is generated is the first to appear in a list of users. This is reflected in the positioning of the option 710 at the top right of the GUI 700, above the options 712 and 714.

FIG. 7 shows User B viewing the scene from the same perspective shown in FIGS. 6B and 6C, as apparent from the depictions of object 602 and object 604. FIG. 7 is also an example of an indirect following scenario. In this example, User C is being followed by User A, indicated by a graphical element 742. Additionally, User B is currently being followed by User C, indicated by a graphical element 744. User A is indirectly following User B because User A is following User C while, at the same time, User C is following User B. Therefore, the viewing direction being used to generate an output video stream for User A corresponds to the viewing direction of User B.

The GUI 700 includes a graphical element 750 as an example of how User B's device might respond to a request from User B to follow User A in this scenario where, as discussed above, User A is indirectly following User B. The User B may submit a request to follow User A under the mistaken belief that this would switch the output video stream to the perspective of User A. The mistake is understandable since the option 710 only shows, via the graphical element 744, that User C is following User B. It may not be readily apparent to User B that User A is already viewing the scene from User B's perspective.

If User's B request to follow User A were granted, this would create a cyclic dependency since the chain of users would link back to User B. Therefore, even if User B's follow request could be granted without causing any expected system behavior, the output video stream for User B would continue to be generated based on User B's viewing direction. Accordingly, the GUI 700 is updated using the graphical element 750 to alert User B to the fact that the follow request is invalid due to User B being followed by User A. Alternatively, in some implementations, the graphical element 750 may be omitted, and User B's device may simply deny the request to follow User A without informing User B that the request was denied.

Figure 8:
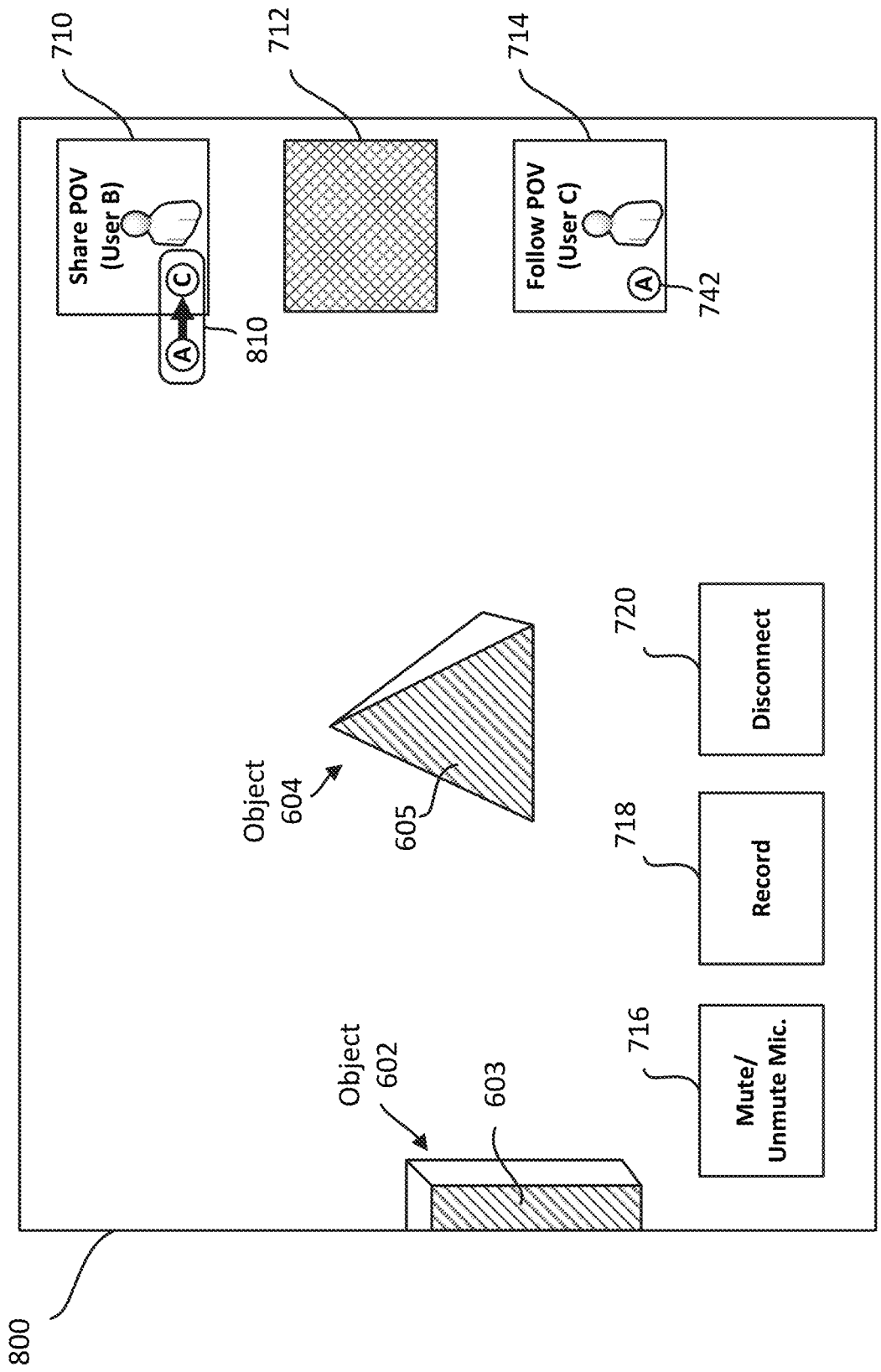

FIG. 8 illustrates an example GUI 800 reflecting an attempt to follow a user in a cyclical manner, according to some embodiments. FIG. 8 shows another way in which User B's device might respond to the follow request discussed above with respect to FIG. 7. The GUI 800 is similar to the GUI 700 but omits the graphical element 750. Instead of displaying the graphical element 750 or some other error message, the GUI 800 displays a graphical element 810 that depicts the chain of users who are currently following User B. The graphical element 810 indicates that User A is following User C. Accordingly, when the follow request is denied and the output video stream continues to be generated based on User B's viewing direction, User B will be able to understand why the request was denied. In particular, upon seeing the graphical element 810, User B may realize that there is a chain of users following User B that includes User A so that it would not make sense to try to follow User A. In addition or as an alternative to the graphical element 810, the GUI 800 can be updated to render it impossible to submit a request to follow User A. For example, the option 712 may be disabled (e.g., rendered non-clickable) and grayed out or displayed in some other manner that visually distinguishes the option 712 from options that are valid.

Figure 9A:
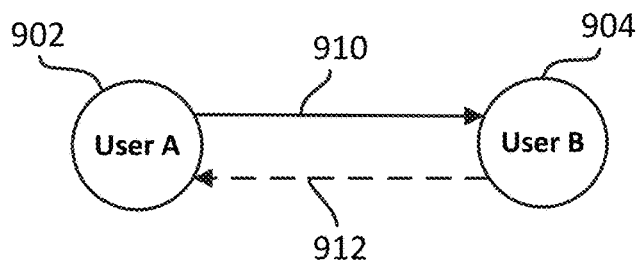
FIGS. 9A to 9C illustrate examples of cyclical following scenarios.
Figure 9B:
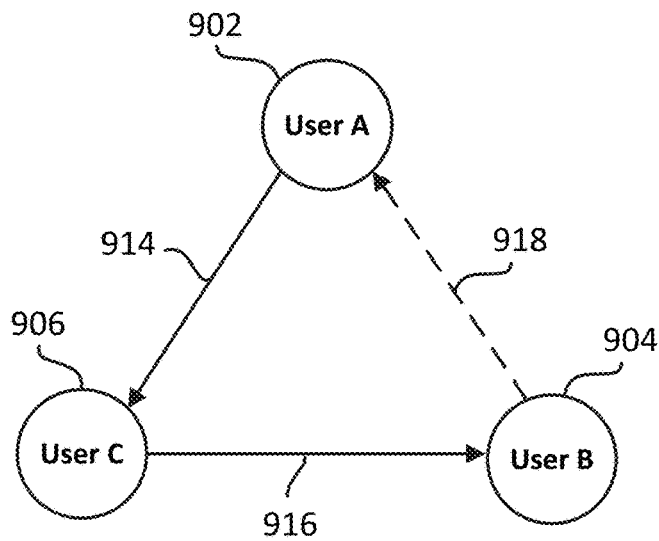
Figure 9C:
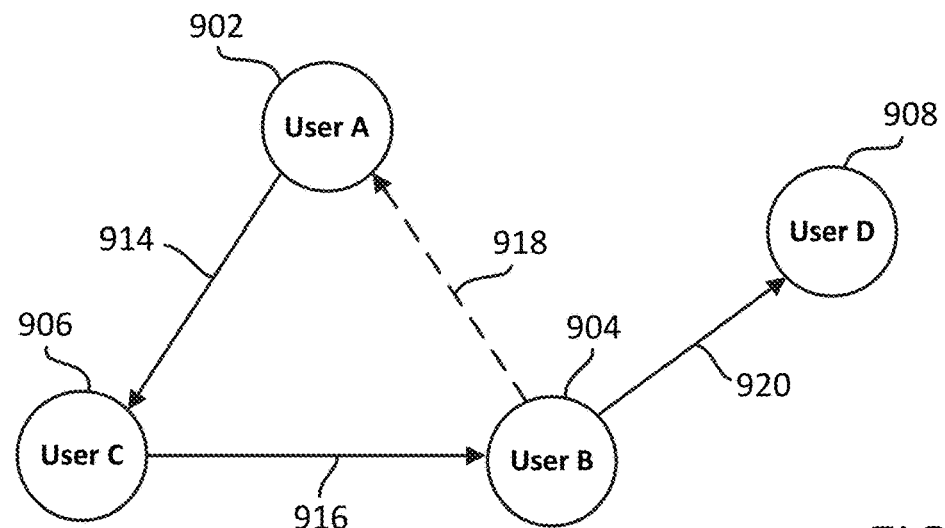

FIGS. 9A to 9C illustrate examples of cyclical following scenarios. In FIGS. 9A to 9C, the scenarios are depicted using a directed graph of nodes, where each node represents an individual user. An edge leading from a first node to a second node indicates that the user represented by the first node previously submitted a follow request for following the user represented by the second node, and the follow request was granted. Accordingly, a follow request can be identified as being invalid when the follow request causes the directed graph to transition from an acyclic graph to a cyclic graph. Although the scenarios are depicted in graph form, a computer device responsible for determining whether to grant a follow request can track the follow status of users using any suitable data structure or combination of data structures. For example, each user device 130 in FIG. 1 may be configured to maintain a table or linked list in a local memory of the user device and to update the table/linked list based on the most recently received information from the server 150.

FIG. 9A shows an example of a cyclic dependency arising in a direct following scenario. In FIG. 9A, User A and User B are represented by a node 902 and a node 904, respectively. At the time of a follow request from User B, the User A is already following User B, as indicated by an edge 910 from the node 902 to the node 904. The follow request from User B is a request to follow User A and is indicated by an edge 912 from the node 904 to the node 902. The edge 912 is depicted as a dashed line to indicate that the connection between the nodes has not yet been formed. The computer device processing User B's follow request can deny the request based on determining that forming the edge 912 would cause the graph to become cyclic. FIG. 9A is an example of a direct following scenario because the user who submits the follow request (User B) is currently the subject of a follow request from the user who User B wishes to follow (User A).

In the example of FIG. 9A, granting User B's follow request could potentially cause User A's device and User B's device to become locked onto the perspective of User B. This is because User B's perspective has already been adopted by User A. Assuming that the follow request from User B is granted, the output video streams for both users may be generated using the viewing direction of User B until the graph reverts to being acyclic. For example, the viewing direction of User B may continue to be used for generating the output video streams of User A and User B until one of the users cancels their follow request.

FIG. 9B shows an example of a cyclic dependency arising in an indirect following scenario. Here, the chain of users includes User A, User B, and User C. User A and User B are represented by the same nodes as in FIG. 9A. The User C is represented by a node 906. In FIG. 9B, User A is following User C, indicated by an edge 914 from the node 902 to the node 906. Additionally, User C is following User B, indicated by an edge 916 from the node 906 to the node 904. The follow request in this example is a request from User B to follow User A, indicated by an edge 918 from the node 904 to the node 902. Thus, the scenario in FIG. 9A corresponds to the scenario discussed above in conjunction with FIG. 7. As discussed above, User B's follow request is invalid in such a scenario because the chain of users would link back to User B. If the edge 918 were formed, this would create a path from the node 904 back to the node 904, via the nodes 902 and 906. Similarly, there would be path from node 902 back to node 902, and a path from node 906 back to node 906.

In the example of FIG. 9B, granting User B's follow request could potentially cause User A's device, User B's device, and User C's device to become locked onto the perspective of User B. This is because User B's perspective has already been adopted (directly) by User C and adopted (indirectly) by User A. Assuming that the follow request from User B is granted, the output video streams for all three users (A, B, and C) may be generated using the viewing direction of User B until the graph reverts to being acyclic. For example, the viewing direction of User B may continue to be used for generating the output video streams of User A, User B, and User C until one of the users cancels their follow request.

FIG. 9C shows an indirect following scenario similar to that in FIG. 9B, but with an additional node 908 representing User D. In FIG. 9C, the graph becomes cyclic in the same manner discussed above with respect to FIG. 9B. Specifically, at the time of a request from User B to follow User A, the User A is following User C, and User C is following User B. In addition to the edges 914, 916, and 918 described above, FIG. 9C also includes an edge 920 from the node 904 to the node 908 to indicate that User B is following User D. In the earlier examples described above, the user submitting an invalid follow request is not following anyone else at the time of the follow request. FIG. 9C is provided in order to illustrate that this is not always the case.

In the example of FIG. 9C, granting User B's follow request could potentially cause User A's device, User B's device, and User C's device to become locked onto the perspective of User D. This is because at the time of User B's request, User D's perspective has been adopted (directly) by User B and adopted (indirectly) by User A and User C. Assuming that the follow request from User B is granted, the output video streams for User A, User B, and User C may be generated using the viewing direction of User D until the graph reverts to being acyclic. Even though User B would no longer be following User D but would instead follow User A, the only viewing direction being used to generate an output video stream at the time of User B's follow request is the viewing direction of User D. Additionally, User D's device could, in effect, also become locked to User D's perspective if User B's request were granted. Even though User D may be free to follow another user, there are no other users with a viewing direction different from that of User D. Therefore, User D's device may maintain the viewing direction of User D regardless of who User D chooses to follow. The viewing direction of User D may continue to be used for generating the output video streams for all the users (A, B, C, and D) until one of the users along the cyclical path (User A, User B, or User C) cancels their follow request. Thus, cyclic dependencies may negatively affect even users who are not part of the cycle.

FIG. 10A shows an example of user information maintained by a computer system, according to some embodiments. The user information includes a table 1000 in which each row of the table corresponds to an entry for an individual user. In some examples, each user device may be configured to maintain a copy of the table 1000 in local memory and to keep the table 1000 updated based on information from a server such as the server 150. The server may also maintain a copy (e.g., a master copy) of the table 1000 for distribution to user devices.

As shown in FIG. 10A, each table entry indicates who the user is following in addition to the viewing direction currently being used to generate an output video stream for the user. In the example shown, no user is following anyone else. Thus, the viewing direction for User A may correspond to a quaternion associated with User A, e.g., a combined quaternion generated by User A's device in the manner described above with respect to FIG. 4. Similarly, the viewing directions for User B, User C, and User D may correspond to a quaternion associated with User B, a quaternion associated with User C, and a quaternion associated with User D, respectively.

FIG. 10B shows an example of user information updated based on follow requests from different users, according to some embodiments. In FIG. 10B, the table 1000 has been updated to indicate that User A is following User C, User B is following User D, and User C is following User B. Thus, FIG. 10B corresponds to the scenario in FIG. 9C prior to the request from User B to follow User A. As discussed above, at the time of User B's request, User D's perspective has been adopted either directly or indirectly by User A, User B, and User C. Accordingly, the table 1000 has been updated to indicate that the current viewing direction for each user is a quaternion associated with User D, e.g., a combined quaternion generated by User D's device.

In FIG. 10B, the table 1000 is structured so that the viewing direction information for a user is replaced (overwritten) in accordance with changes in the follow statuses of the users. The table 1000 may change to the state shown in FIG. 10B once the path from A to C to B to D is established. For instance, suppose that the follow request which causes the table 1000 to become as shown in FIG. 10B is a request from User C to follow User B, e.g., a request that creates the edge 916 in FIG. 9C. At the time of User C's request, User A is following User C, and User B is following User D. Therefore, the entry for User A may indicate User C's quaternion, the entry for User B may indicate User D's quaternion, the entry for User C may indicate User C's quaternion, and the entry for User D may indicate User D's quaternion. When User C's request is granted, the entries for User A and User C may be updated to indicate User D's quaternion. The entries for User B and User D need not be updated since the viewing direction indicated in these entries already reflects the current follow statuses of the users.

FIGS. 10A and 10B are provided as nonlimiting examples of user information that can be maintained by a computer system for use in determining whether a follow request should be granted. Other types of user information may be used in addition or as an alternative to the information shown in the table 1000, depending on implementation. For example, in some embodiments, each user device can retain information describing the user's previous viewing direction so that the output video stream can revert to the user's perspective in the event that the user cancels their follow request. For instance, if User C stops following User B, the output video streams for User A and User C can resume being generated based on User C's previous viewing direction without requiring User C to reconfigure their virtual camera.

Figure 11:
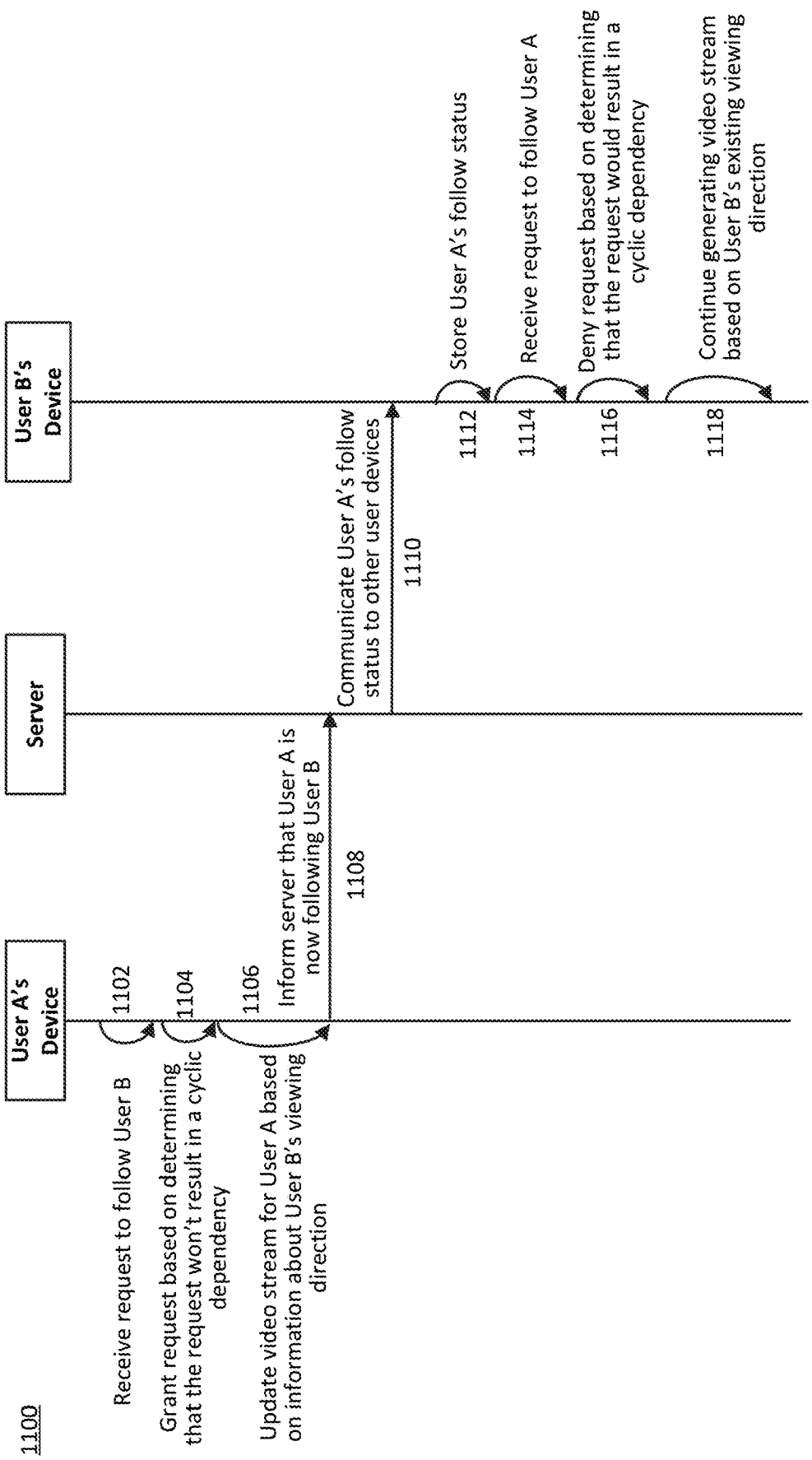
FIG. 11 is a flow diagram of a process for determining whether to grant a user's follow request, according to some embodiments.

FIG. 11 is a flow diagram of a process 1100 for determining whether to grant a user's follow request, according to some embodiments. The process 1100 involves functionality performed by a first user device (operated by User A), a second user device (operated by User B), and a server (e.g., server 150). At step 1102, the first user device receives a request from User A to follow User B. The request from User A may be received through a GUI, for example, based on selecting the option 612 in FIG. 6A.

Figure 13:
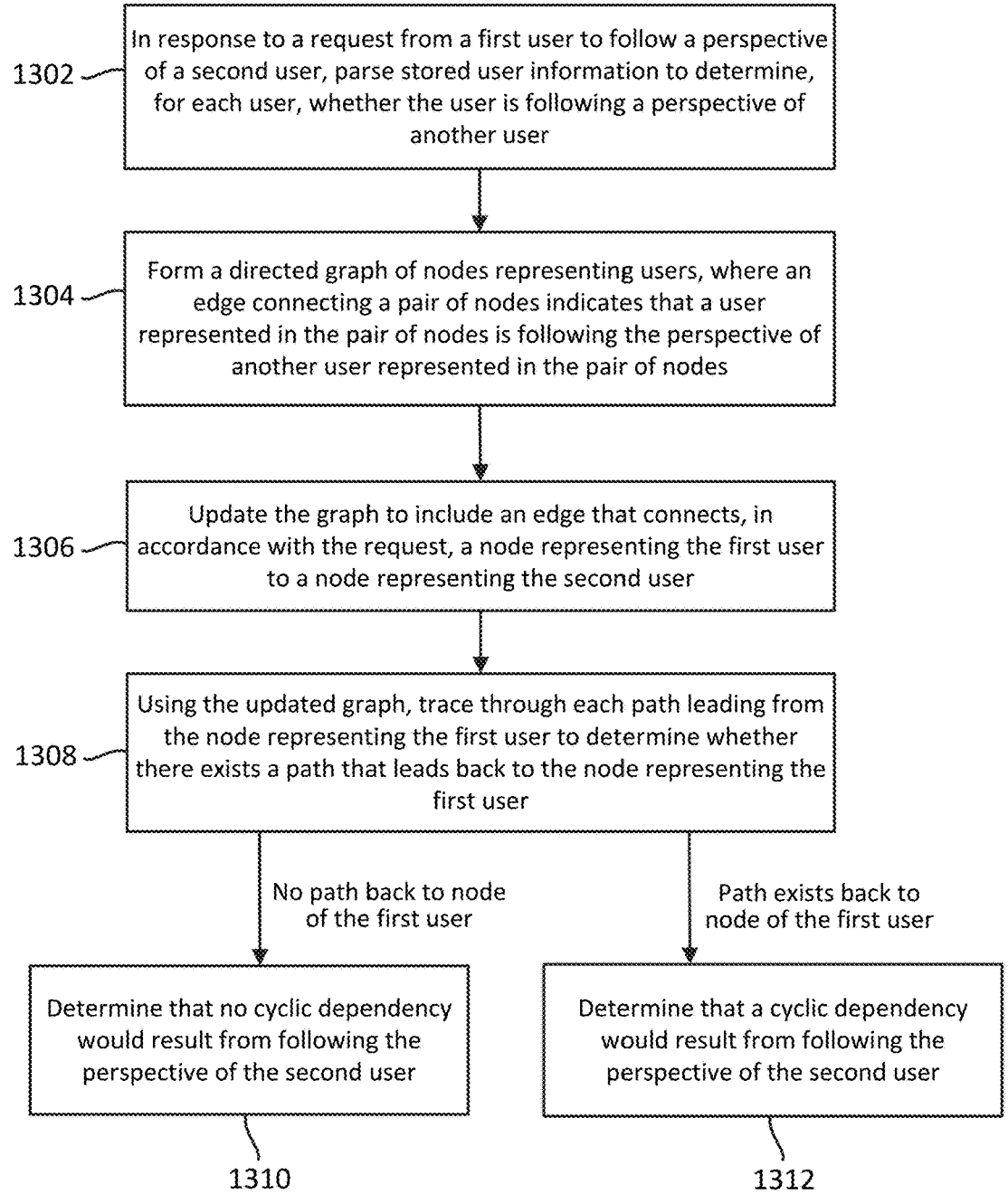
FIG. 13 is a flowchart showing a method for determining whether a cyclic dependency would be formed as a result of a follow request, according to some embodiments.

At step 1104, the first user device grants User A's request based on determining that the request won't result in a cyclic dependency. An example of a method for determining whether a cyclic dependency will be formed is shown in FIG. 13, described below. In response to the determination in step 1104, the first user device grants the request to follow User B, and the process proceeds to step 1106.

At step 1106, the first user device updates the video stream being generated for User A in accordance with User A's request. The updating of the video stream is performed based on information about User B's viewing direction. For example, the first user device may have received a quaternion associated with User B prior to receiving the request in step 1102. Alternatively, upon granting User A's request, the first user device may query the server to determine whether the previously received viewing direction information is outdated. If so, the server may communicate an updated quaternion associated with User B to the first user device.

At step 1108, the first user device informs the server that User A is now following User B. For example, the first user device may update a local copy of the table 1000 to reflect the change in User A's follow status. Concurrently with updating the local copy of table 1000, the first user device may send a message to the server indicating User A's new follow status, i.e., that User A is now following User B.

At step 1110, the server communicates User A's follow status to other user devices. For example, upon receiving the information in step 1108, the server may broadcast a message to all user devices that are currently in communication with the server to inform the user devices that User A is following User B. Optionally, the server may update its own copy of the table 1000 to correspond to the local copy of the table 1000 maintained by the first user device. The copy of the table 1000 maintained by the server can be used to keep the table synchronized across all user devices. In the event that there is a discrepancy between user devices as to the information in the table 1000, the copy maintained by the server can be referenced to resolve the discrepancy. Maintaining a server side copy would also enable the server to retransmit the contents of the table 1000, e.g., repeated broadcast at regular intervals. In this manner, a user device that misses the initial broadcast, e.g., due to joining the videoconference after the events of step 1110, can still obtain the latest version of the table 1000.

At step 1112, the information communicated by the server in step 1110 is received and stored by the second user device. For instance, the second user device may update its local copy of the table 1000 to reflect User A's new follow status, thereby synchronizing the local copy maintained by the second user device with the local copy maintained by the first user device.

At step 1114, the second user device receives a request from User B to follow User A. The request from User B may be received through a GUI in a similar manner to the request from User A in step 1102.

At step 1116, the second user device denies User B's request based on determining that the request would result in a cyclic dependency, and the process proceeds to step 1118.

At step 1118, the second user device continues generating an output video stream for User B based on User B's existing viewing direction. The existing viewing direction can be a direction that was specified by controlling the second user device, e.g., to generate a combined quaternion based on input from User B. Alternatively, the existing viewing direction can be a viewing direction associated with another user. This may occur when, for example, User B submitted a follow request prior to the request in step 1114 (e.g., a request to follow User C) and the earlier request was granted.

Figure 12:
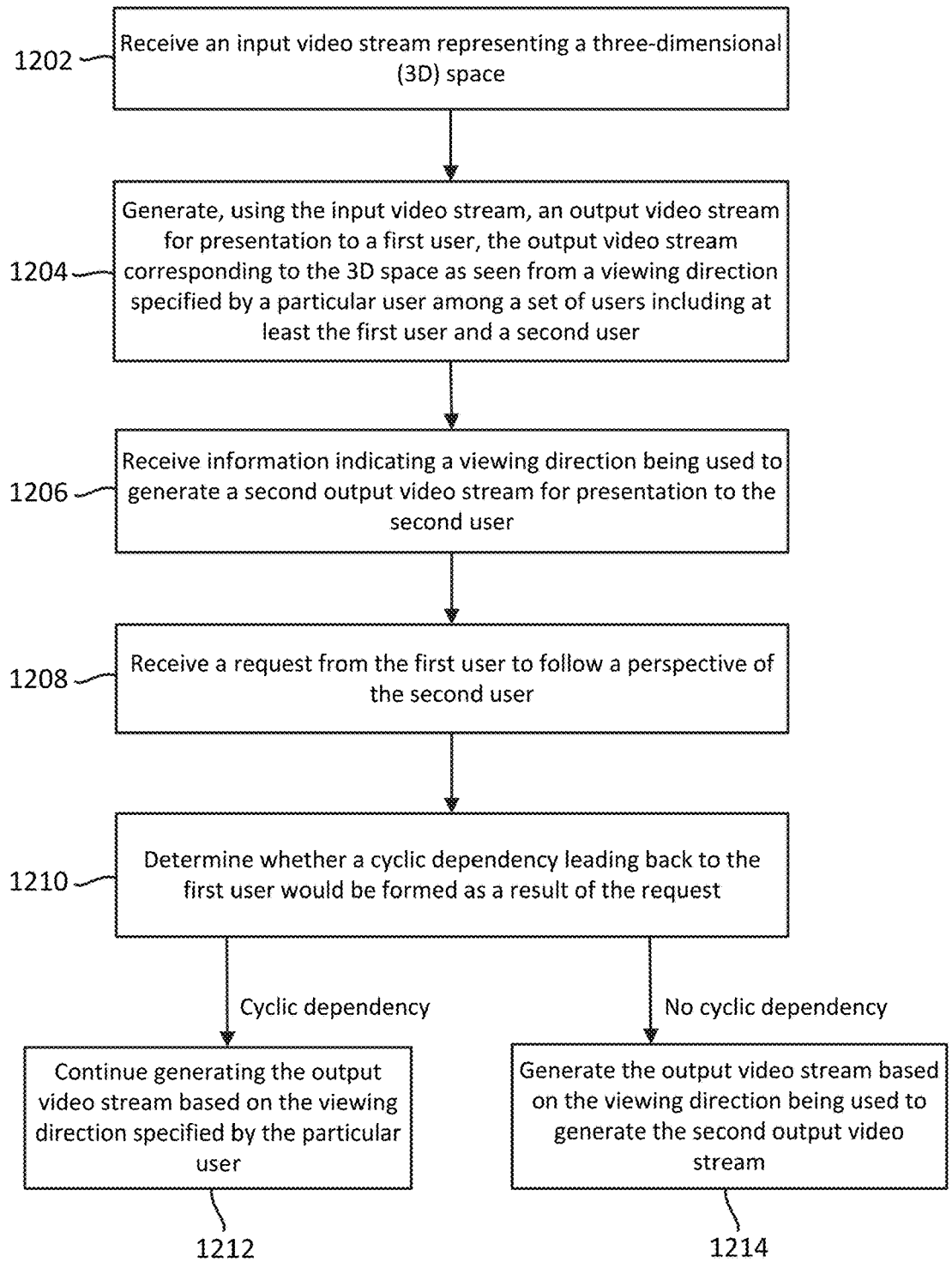
FIG. 12 is a flowchart showing a method for updating a video stream based on a follow request, according to some embodiments.

FIG. 12 is a flowchart showing a method 1200 for updating a video stream based on a follow request, according to some embodiments. The method 1200 involves functionality performed by one or more processors of a computer device responsible for determining whether to grant a follow request. For example, the method 1200 may be performed at a user device that receives the follow request through user input to a GUI generated by the user device. At block 1202, the computer device receives an input video stream representing a 3D space. Referring back to FIG. 1, the input video stream in block 1202 may be a video stream communicated directly from a camera, as in the case the user device 130-A. Alternatively, the input video stream in block 1202 may be received through an intermediary such as the server 150.

At block 1204, the computer device generates an output video stream using the input video stream received in block 1202. The output video stream corresponds to the 3D space as seen from a viewing direction specified by a particular user, e.g., based on the particular user's quaternion. The particular user can be any user among a set of users that includes at least a first user (e.g., the operator of the computer device) and a second user. Further, the output video stream is a stream that will be presented to the first user. For example, the computer device may be User A's device generating an output video stream for presentation to User A.

In instances where the operator of the computer device is following another user, either directly or indirectly, the particular user can be some other user. For example, at the time of generating the output video stream in block 1204, User A may be following User B, in which case the particular user could be User B. As another example, User A may be following User B, and User B may be following User C, in which case the particular user could be User C. Accordingly, the output video stream may be generated from the perspective of the operator of the computer device or from someone else's perspective due to the operator having adopted (directly or indirectly) the perspective of another user.

At block 1206, the computer device receives information indicating a viewing direction being used to generate a second output video stream for presentation to the second user. The computer device may receive the information on-demand, e.g., through sending an information request to a server such as the server 150. Alternatively, as discussed above, such information can be broadcast to multiple devices, in which case the computer device may receive the information without explicitly requesting it. Since information indicating user viewing directions can be communicated periodically, the receiving of the information in block 1206 can be performed before or after the output video stream is generated in block 1204.

Similar to the output video stream presented to the first user, the second output video stream can be generated from the perspective of the second user or some other user. In the case where the second user is not following another user, the viewing direction being used to generate the second output video stream can be a viewing direction specified by the second user. Alternatively, if the second user is following a third user, the viewing direction being used to generate the second output video stream can be a viewing direction specified by the third user.

At block 1208, the computer device receives a request from the first user to follow a perspective of the second user.

At block 1210, the computer device determines whether a cyclic dependency leading back to the first user would be formed as a result of the request. For example, the computer device may perform a check to determine whether User A would, upon granting the request, become a member of a user chain that links back to User A. If the result of the determination in block 1210 is that a cyclic dependency would be formed, then the method proceeds to block 1212. Otherwise, the method proceeds to block 1214. In either case, the output video stream for the first user is updated according to the result of the determination.

At block 1212, the computer device continues generating the output video stream based on the viewing direction specified by the particular user. For instance, the computer device may apply the particular user's viewing direction to another segment of the input video stream to generate one or more image frames for presentation to the first user.

At block 1214, the computer device has determined that no cyclic dependency would be formed as a result of the request to follow the perspective of the second user. Accordingly, the computer device grants the request by generating the output video stream based on the viewing direction that is currently being used to generate the second output video stream. The computer device may continue applying the viewing direction that is being used to generate the second output video stream until the first user cancels the request or until a follow request from a different user in the chain causes the computer device to switch to a different viewing direction.

FIG. 13 is a flowchart showing a method 1300 for determining whether a cyclic dependency would be formed as a result of granting a follow request, according to some embodiments. The method 1300 can be used to implement the functionality in block 1210 of FIG. 12 and as, such, may be performed by one or more processors of a computer device responsible for determining whether to grant a follow request.

At block 1302, stored user information is parsed in response to a request from a first user to follow a perspective of a second user, i.e., a follow request from the first user with the second user being the subject of the follow request. The stored user information includes information indicating who each user (the first user, the second user, and any other user participants) is following, if any. Additionally, the stored user information indicates the viewing direction currently being used to generate the output video stream for each user. As discussed above, such user information may be stored in the form of a table (e.g., the table 1000) or other suitable data structure and, in some instances, may represent or be processed to generate a computer representation of a directed graph such as the graphs illustrated in FIGS. 9A-9C.

The user information may be stored in a local memory of the computer device, for example, in working memory allocated to the video application 222. The user information may be updated periodically through communications between the computer device performing the method 1300 and one or more additional computer devices. In some embodiments, each user device is configured to send an update to a server (e.g., the server 150) whenever there is a change in the viewing direction or follow status associated with the user device. The server may in turn communicate the update to other user devices. Alternatively or additionally, user devices may send updates directly to each other in some embodiments.

At block 1304, a directed graph of nodes representing the users is formed. The directed graph may be explicitly encoded in the user information, in which case the directed graph can be extracted during the parsing in block 1304. Alternatively, the directed graph may be constructed according to the extracted user information. The directed graph can include edges connecting a pair of nodes to indicate that a user represented in the pair of nodes is following the perspective of another user represented in the pair of nodes. Depending on the follow statuses of the users at the time of the follow request in block 1302, the directed graph may include one or more such edges.

At block 1306, the directed graph is updated to include an edge in accordance with the follow request from block 1302. That is, an edge is tentatively formed which leads from a node representing the first user to a node representing the second user. In this manner, the updated graph reflects the state of the users assuming that the follow request is granted.

At block 1308, the updated graph is used to trace through each path leading from the node representing the first user to determine whether there exists a path that leads back to the node representing the first user. In implementations where each user is only permitted to follow a single user at a time, this means that every path evaluated in this manner begins with the edge that was added in block 1306. If the result of the determination in block 1308 is that there are no paths leading back to the node representing the first user, the method proceeds to block 1310. Otherwise, the method proceeds to block 1312.

At block 1310, it is determined that no cyclic dependency would result from following to the perspective of the second user. Accordingly, the follow request may be granted, e.g., in accordance with block 1214 in FIG. 12, and subject to any other prerequisite conditions that might be evaluated as part of processing the follow request.

At block 1312, it is determined that a cyclic dependency would result from following the perspective of the second user. Accordingly, the follow request may be denied solely on this basis, e.g., in accordance with block 1212 in FIG. 12.

Some portions of this description describe the embodiments of the disclosure in terms of algorithms and operations. These operations are understood to be implemented by computer programs or equivalent electrical circuits, machine code, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

The methods described above, including the example processes depicted in the drawings, can be performed in combination with each other and may involve steps performed by user devices and a server in communication with the user devices. In some embodiments, one or more methods may be performed using the system depicted in FIG. 1. Although presented as a sequence of steps, each of the methods described herein may be performed with certain steps being executed in a different order, omitted, or in parallel. In certain embodiments, each of the methods may be implemented through program instructions that are stored on a non-transitory computer readable medium (e.g., a storage memory of a user device) and executed by one or more processors.

In some embodiments, a software module is implemented with a computer program product comprising a non-transitory computer-readable storage medium containing computer program code, which can be executed by one or more computer processors for performing any or all of the steps, operations, or processes described. Examples of a non-transitory storage medium include, but are not limited to, a magnetic disk or tape, optical storage media such as compact disk (CD) or digital versatile disk (DVD), flash memory, or other memory devices.

The specification and drawings are, accordingly, to be regarded in an illustrative rather than a restrictive sense. It will, however, be evident that additions, subtractions, deletions, and other modifications and changes may be made thereunto without departing from the broader spirit and scope set forth in the claims. Thus, although specific embodiments have been described, these are not intended to be limiting. Various modifications and equivalents are within the scope of the following claims.

What is claimed is:

1. A method for shared viewing of video, the method comprising:
    receiving, by a first computer device operated by a first user, an input video stream representing a three-dimensional (3D) space;
    generating, by the first computer device and using the input video stream, an output video stream corresponding to the 3D space as seen from a viewing direction specified by a particular user among a set of users including at least the first user and a second user, wherein each user in the set of users operates a separate computer device;
    presenting, by the first computer device, the output video stream on a display to the first user;
    receiving, by the first computer device, a request from the first user to follow a perspective of the second user;
    determining, in response to the request to follow the perspective of the second user, whether a cyclic dependency leading back to the first user would be formed as a result of the request; and
    updating the output video stream, the updating comprising:
        continuing to generate the output video stream based on the viewing direction specified by the particular user, in response to determining that the cyclic dependency would be formed; or
        generating the output video stream based on a viewing direction associated with the second user, in response to determining that the cyclic dependency would not be formed.

2. The method of claim 1, wherein the updating of the output video stream comprises generating the output video stream based on the viewing direction associated with the second user.

3. The method of claim 2, wherein the viewing direction associated with the second user is a viewing direction specified by the second user.

4. The method of claim 2, wherein the viewing direction associated with the second user is a viewing direction specified by a third user whose perspective the second user is following at a time of the request.

5. The method of claim 2, further comprising:
    informing, by the first computer device and through a server, computer devices of other users in the set of users that the first user is now following the perspective of the second user.

6. The method of claim 1, wherein the updating of the output video stream comprises continuing to generate the output video stream based on the viewing direction specified by the particular user.

7. The method of claim 6, wherein the particular user is the first user.

8. The method of claim 6, wherein the particular user is a third user whose perspective the first user is following at a time of the request.

9. The method of claim 1, further comprising:
    determining that the cyclic dependency would be formed because the second user is already following a perspective of the first user at a time of the request.

10. The method of claim 9, further comprising:
    determining that the second user is indirectly following the perspective of the first user through a chain of one or more additional users.

11. An apparatus comprising:
    one or more processors;
    a display; and
    a memory storing instructions that, when executed by the one or more processors, cause the one or more processors to:
        receive an input video stream representing a three-dimensional (3D) space;
        generate, using the input video stream, an output video stream corresponding to the 3D space as seen from a viewing direction specified by a particular user among a set of users including at least a first user and a second user, wherein each user in the set of users operates a separate computer device;
        present the output video stream on the display to the first user;
        receive a request from the first user to follow a perspective of the second user;
        determine, in response to the request to follow the perspective of the second user, whether a cyclic dependency leading back to the first user would be formed as a result of the request; and
        update the output video stream, the updating comprising:
            continuing to generate the output video stream based on the viewing direction specified by the particular user, in response to determining that the cyclic dependency would be formed; or
            generating the output video stream based on a viewing direction associated with the second user, in response to determining that the cyclic dependency would not be formed.

12. The apparatus of claim 11, wherein the updating of the output video stream by the one or more processors comprises generating the output video stream based on the viewing direction associated with the second user.

13. The apparatus of claim 12, wherein the viewing direction associated with the second user is a viewing direction specified by the second user.

14. The apparatus of claim 12, wherein the viewing direction associated with the second user is a viewing direction specified by a third user whose perspective the second user is following at a time of the request.

15. The apparatus of claim 12, wherein the instructions further cause the one or more processors to:
    inform, through a server, computer devices of other users in the set of users that the first user is now following the perspective of the second user.

16. The apparatus of claim 11, wherein the updating of the output video stream by the one or more processors comprises continuing to generate the output video stream based on the viewing direction specified by the particular user.

17. The apparatus of claim 16, wherein the particular user is the first user.

18. The apparatus of claim 16, wherein the particular user is a third user whose perspective the first user is following at a time of the request.

19. The apparatus of claim 11, wherein the instructions further cause the one or more processors to:
    determine that the cyclic dependency would be formed because the second user is already following, either directly or through a chain of one or more additional users, a perspective of the first user at a time of the request.

20. A non-transitory computer-readable storage medium containing instructions that, when executed by one or more processors of a computer device operated by a first user, cause the one or more processors to:
    receive an input video stream representing a three-dimensional (3D) space;
    generate, using the input video stream, an output video stream corresponding to the 3D space as seen from a viewing direction specified by a particular user among a set of users including at least the first user and a second user, wherein each user in the set of users operates a separate computer device;
    present the output video stream on a display to the first user;
    receive a request from the first user to follow a perspective of the second user;
    determine, in response to the request to follow the perspective of the second user, whether a cyclic dependency leading back to the first user would be formed as a result of the request; and
    update the output video stream, the updating comprising:
        continuing to generate the output video stream based on the viewing direction specified by the particular user, in response to determining that the cyclic dependency would be formed; or
        generating the output video stream based on a viewing direction associated with the second user, in response to determining that the cyclic dependency would not be formed.

* * * * *